(12) United States Patent
Adams et al.

(10) Patent No.: US 12,502,095 B2
(45) Date of Patent: Dec. 23, 2025

(54) HANDHELD RESPIRATORY DIAGNOSTIC, TRAINING, AND THERAPY DEVICES AND METHODS

(71) Applicant: Resper, Inc., San Francisco, CA (US)

(72) Inventors: Richard Steven Adams, Castle Rock, CO (US); Colton James Crandell, Castle Rock, CO (US); James Nestor, San Francisco, CA (US)

(73) Assignee: Resper, Inc., San Francisco, CA (US)

( * ) Notice: Subject to any disclaimer, the term of this patent is extended or adjusted under 35 U.S.C. 154(b) by 788 days.

(21) Appl. No.: 17/382,223

(22) Filed: Jul. 21, 2021

(65) Prior Publication Data

US 2022/0022772 A1    Jan. 27, 2022

Related U.S. Application Data

(60) Provisional application No. 63/054,604, filed on Jul. 21, 2020.

(51) Int. Cl.
*A61B 5/08* (2006.01)
*A61B 5/00* (2006.01)
(Continued)

(52) U.S. Cl.
CPC ............ *A61B 5/0816* (2013.01); *A61B 5/097* (2013.01); *A61B 5/4836* (2013.01);
(Continued)

(58) Field of Classification Search
CPC ..... A61B 5/0816; A61B 5/097; A61B 5/4836; A61B 5/7246; A61B 5/742; A61B 5/7455; A61B 5/08; A61B 5/74; A61B 2562/0247; A61B 5/14552; A61B 5/0836; A61B 5/087; G09B 23/28; G09B 19/00; A63B 2024/0093; A63B 2220/17; A63B 2220/30; A63B 2220/54; A63B 2220/56;
(Continued)

(56) References Cited

U.S. PATENT DOCUMENTS 4,981,295 A    1/1991   Belman et al.
8,459,255 B2   6/2013   Spurling et al.
(Continued)

FOREIGN PATENT DOCUMENTS

CN    208988880 U       6/2019
CN    110123301 A   *   8/2019    ........... A61B 5/1116
(Continued)

OTHER PUBLICATIONS

Chinese Patent Document CN 110960834 A, translation provided by Espacenet (Year: 2020).*
(Continued)

*Primary Examiner* — Jennifer Robertson
*Assistant Examiner* — Jonathan Drew Moroneso
(74) *Attorney, Agent, or Firm* — Van Pelt, Yi & James LLP

(57) ABSTRACT

Systems and methods directed to handheld respiratory diagnostics, trainings, and therapy are disclosed. More specifically, a device that collects data associated with a user's breathing using sensors, analyzes that data to determine time series readings of one or more health-related vitals, and generates trainings and therapies to assist the user in real time is described.

20 Claims, 25 Drawing Sheets

(51) Int. Cl.
*A61B 5/097* (2006.01)
*G09B 23/28* (2006.01)

(52) U.S. Cl.
CPC ............ *A61B 5/7246* (2013.01); *A61B 5/742* (2013.01); *A61B 5/7455* (2013.01); *G09B 23/28* (2013.01); *A61B 5/08* (2013.01); *A61B 5/74* (2013.01); *A61B 2562/0247* (2013.01)

(58) Field of Classification Search
CPC ............ A63B 2220/62; A63B 2225/02; A63B 2225/50; A63B 2225/74; A63B 2230/06; A63B 2230/30; A63B 2230/40; A63B 2230/431; A63B 2230/433; A63B 2230/50; A63B 21/0059; A63B 23/18; A63B 24/0087

See application file for complete search history.

(56) References Cited

U.S. PATENT DOCUMENTS

| | | | |
|---|---|---|---|
| 9,706,946 | B2 | 7/2017 | Brimer et al. |
| 2004/0187869 | A1 | 9/2004 | Bjorndal et al. |
| 2009/0112114 | A1* | 4/2009 | Ayyagari ............... A61B 7/003 |
| | | | 600/529 |
| 2011/0124470 | A1* | 5/2011 | Spurling ............... A63B 23/18 |
| | | | 482/13 |
| 2014/0127650 | A1* | 5/2014 | Utter, II ................. G16H 20/60 |
| | | | 434/127 |
| 2016/0120462 | A1* | 5/2016 | Tunnell ................ A61B 5/7225 |
| | | | 600/529 |
| 2017/0156593 | A1* | 6/2017 | Ferber .................. A61B 5/6816 |
| 2018/0272189 | A1* | 9/2018 | Lee .......................... G06F 3/011 |
| 2019/0299055 | A1* | 10/2019 | Poulsen ................. A63B 23/18 |
| 2020/0174262 | A1* | 6/2020 | Godar ..................... G06F 3/015 |
| 2021/0146079 | A1* | 5/2021 | Alizoti ................. A61M 15/009 |
| 2021/0321883 | A1* | 10/2021 | Mcmahan .......... A61B 5/02055 |
| 2023/0330378 | A1* | 10/2023 | Peres .................. A61M 16/201 |

FOREIGN PATENT DOCUMENTS

| | | | |
|---|---|---|---|
| CN | 110960834 A | * | 4/2020 |
| CN | 111388819 A | | 7/2020 |
| WO | WO-2021119305 A1 | * | 6/2021 |

OTHER PUBLICATIONS

Fang et al., Chinese Patent Document CN 110123301—citing to translation from Espacenet.com (Year: 2019).*

International Search Report and Written Opinion for PCT/US2021/042624 mailed Nov. 4, 2021, all pages.

European Patent Office, Partial Supplementary European Search Report, EP Patent Application No. 21845845.3, Aug. 14, 2024, 14 pages.

* cited by examiner

User Joe G (48285)

| Reading | Date, Time | Age | Weight | Temp | SPO2 | Heart Rate | Peak Flow | Vital Cap | pCO2 |
|---|---|---|---|---|---|---|---|---|---|
| 1 | 10/20/2019, 9:00pm | 38 | 232 | 98.7 | 99.2% | 65 | 650 | 70 | 40 |
| 2 | 10/21/2019, 9:15pm | 38 | 232 | 98.3 | 96.5% | 68 | 666 | 71 | 40 |
| 3 | 10/22/2019, 9:05pm | 38 | 231 | 98.3 | 95.1% | 66 | 653 | 68 | 41 |
| 4 | 10/24/2019, 9:00pm | 38 | 229 | 98.6 | 98.3% | 62 | 649 | 67 | 40 |
| 5 | 10/25/2019, 9:00pm | 38 | 231 | 99.1 | 95.7% | 72 | 625 | 68 | 42 |
| 6 | 10/26/2019, 9:02pm | 38 | 228 | 100.4 | 92.9% | 79 | 610 | 61 | 39 |
| 7 | 10/27/2019, 9:00pm | 39 | 228 | 101.5 | 91.0% | 91 | 613 | 58 | 38 |
| 8 | 10/28/2019, 9:10pm | 39 | 228 | 101.6 | 89.8% | 102 | 579 | 55 | 40 |
| 9 | 10/29/2019, 9:18pm | 39 | 225 | 102.8 | 86.6% | 113 | 526 | 53 | 41 |
| 10 | 10/30/2019, 9:10pm | 39 | 224 | 100.9 | 87.5% | 109 | 513 | 54 | 42 |
| 11 | 11/1/2019, 9:03pm | 39 | 224 | 100.7 | 89.4% | 101 | 549 | 59 | 45 |
| 12 | 11/2/2019, 9:05pm | 39 | 224 | 100.5 | 90.9% | 95 | 574 | 55 | 47 |
| 13 | 11/3/2019, 9:02pm | 39 | 226 | 99.9 | 92.7% | 82 | 601 | 56 | 49 |
| 14 | 11/4/2019, 9:05pm | 39 | 228 | 99.2 | 94.6% | 81 | 623 | 59 | 48 |
| 15 | 11/5/2019, 9:00pm | 39 | 229 | 98.9 | 95.8% | 78 | 635 | 61 | 45 |
| 16 | 11/6/2019, 9:15pm | 39 | 229 | 98.5 | 97.6% | 69 | 648 | 65 | 42 |
| 17 | 11/8/2019, 9:15pm | 39 | 232 | 98.4 | 98.2% | 65 | 659 | 66 | 41 |
| 18 | 11/9/2019, 9:04pm | 39 | 233 | 98.7 | 96.9% | 66 | 655 | 63 | 40 |
| 19 | 11/11/2019, 9:01pm | 39 | 232 | 98.5 | 99.1% | 67 | 642 | 69 | 42 |
| 20 | 11/12/2019, 9:05pm | 39 | 234 | 98.4 | 98.3% | 62 | 651 | 71 | 40 |

FIG. 10

User Database

| Number | Name | Age | Weight | Score | Conf. | Training |
|---|---|---|---|---|---|---|
| 48285 | Joe G | 39 | 234 | 85.0% | 95.0% | 15C |
| 34354 | John G | 25 | 162 | 50.5% | 10.5% | 32A |
| 83756 | George F | 29 | 184 | 79.0% | 75.5% | 30B |
| 83655 | Dennis K | 77 | 175 | 99.0% | 99.9% | 26A |
| 89385 | Josphine I | 18 | 199 | 52.0% | 26.4% | 52A |
| 78266 | Kendra P | 22 | 115 | 62.1% | 49.9% | 54B |
| 98016 | Elliott K | 44 | 110 | 98.9% | 99.4% | 77B |
| 65794 | Elliouise A | 52 | 265 | 31.0% | 78.4% | 4A |
| 23486 | Lexy T | 25 | 84 | 26.6% | 91.7% | 5B |
| 45796 | Natalie K | 22 | 90 | 98.9% | 99.2% | 77C |
| 24618 | Micaela C | 39 | 140 | 95.0% | 99.2% | 77A |
| 97846 | Yani B | 50 | 305 | 5.0% | 99.9% | 1A |
| 31647 | Dave M | 24 | 468 | 9.0% | 99.1% | 1B |
| 59761 | Snoop D | 48 | 130 | 4.2% | 99.5% | 2A |
| 41359 | Lakesha W | 32 | 151 | 81.3% | 50.0% | 10B |
| 3495 | Black LM | 99 | 100 | 97.8% | 99.0% | 27A |
| 87946 | August C | 36 | 183 | 85.6% | 18.8% | 19P |
| 51793 | Valerie K | 79 | 165 | 99.1% | 99.3% | 26B |
| 84658 | Dominique S | 49 | 176 | 66.7% | 69.0% | 9A |
| 21673 | Russell K | 54 | 215 | 92.0% | 99.5% | 26C |

Training 15C

| Step | Day | Time | Breaths | Pressure | Rest After |
|---|---|---|---|---|---|
| 1 | 1 | 9:00am | 10 | 200 | 30 mins |
| 2 | 1 | 9:00pm | 10 | 200 | 30 mins |
| 3 | 2 | 9:00am | 10 | 200 | 30 mins |
| 4 | 2 | 9:00pm | 10 | 200 | 30 mins |
| 5 | 3 | 9:00am | 20 | 500 | 30 mins |
| 6 | 3 | 9:00pm | 20 | 500 | 30 mins |
| 7 | 4 | 9:00am | 15 | 1000 | 15 mins |
| 8 | 4 | 3:00pm | 15 | 1000 | 22.5 mins |
| 9 | 4 | 9:00pm | 15 | 1000 | 30 mins |
| 10 | 5 | 7:00am | 30 | 750 | 45 mins |
| 11 | 5 | 12:20pm | 30 | 800 | 45 mins |
| 12 | 5 | 5:40pm | 30 | 850 | 60 mins |
| 13 | 5 | 11:00pm | 30 | 900 | 75 mins |

FIG. 12

HANDHELD RESPIRATORY DIAGNOSTIC, TRAINING, AND THERAPY DEVICES AND METHODS

CROSS-REFERENCES TO RELATED APPLICATIONS

This application claims the benefit of, and priority to U.S. Provisional Application Ser. No. 63/054,604, filed Jul. 21, 2020, which is incorporated here by reference.

FIELD OF THE INVENTION

This application relates to handheld respiratory diagnostic, training, and therapy devices and methods. More specifically, this application is directed to a device that collects data associated with a user's breathing using sensors, analyzes that data to determine time series readings of one or more health-related vitals, and generates trainings and therapies to assist the user in real time.

BACKGROUND

A large portion of the world population could become infected with respiratory-related diseases, such as COVID-19. Current tools to diagnose the onset of these types of diseases are either in short supply or inaccurate. Hundreds of thousands of patients who have suffered from severe lung conditions caused by such diseases will require intensive therapy to restore healthy function. Individual therapies are time-consuming and cost-prohibitive. Healthcare centers may continue to be overwhelmed for long periods of time, and may not be able to keep up with demand. There is an urgent need for a portable, easy-to-use device that can reliably and quickly assess temperature and overall respiratory health.

Furthermore, people are paying closer and closer attention to their personal health, including respiratory health, and are more and more active in facilitating improvements in their own health using a variety of methods. Improving respiratory health can require substantial work, such as intense exercise. There is also an urgent need for a portable, easy-to-use device that can assess and improve respiratory health.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

An example embodiment of the present technology may include a diagnostic, training, and therapeutic respiratory device. The respiratory device may comprise, for example, a mouthpiece. The respiratory device may also include an air chamber, wherein the mouthpiece is configured to couple to the air chamber, the removable air chamber comprising one or more of the following: one or more resistance valves; one or more gears configured to change the position of the one or more resistance valves; and a temperature sensor configured to determine a core body temperature of a user that breathes into the mouthpiece. The respiratory device may also include an electronics housing, the electronics housing comprising: a motor configured to control the one or more gears; a differential pressure sensor; and a processor configured to receive data from the temperature sensor and the differential pressure sensor, wherein the processor is configured to determine a differential pressure being applied to the user's breath by comparing a pressure of the user's breath traveling through the air chamber and an ambient air pressure.

Another example embodiment may include a method. The method may comprise, for example, detecting, at a differential pressure sensor integrated into a respiratory device, a breath of a user of the respiratory device; collecting, at the differential pressure sensor, pressure data associated with the breath of the user; determining, by a processor integrated into the respiratory device, a pressure value being applied to the user's breath by the respiratory device; comparing, by the processor, the pressure value with a previous pressure value associated with a previous breath of the user; receiving, at a motor integrated into the respiratory device and from the processor, a command signal to adjust the speed of the motor; adjusting the speed of the motor, wherein adjusting the speed of the motor causes a change in one or more resistance valves integrated into the respiratory device, wherein the position of the resistance valves determine an amount of pressure to be applied to the breath of the user during the user's next breath.

Another example embodiment may include a method. The method may comprise, for example, receiving, at a processor in an electronics housing of a respiratory device, temperature data from a temperature sensor, wherein the temperature sensor is integrated within an air chamber of the respiratory device, and wherein the temperature data is associated with a breath of a user that is using the respiratory device; receiving, at the processor, pressure data from a differential pressure sensor in the electronics housing, wherein the differential pressure sensor is located in the electronics housing, and wherein the pressure data is associated with the breath of the user that is using the respiratory device; receiving, at the processor, SPO2 data from a pulse oximeter sensor integrated within the air chamber, and wherein the SPO2 data is associated with the breath of the user that is using the respiratory device; determining, using the temperature data, pressure data, and SPO2 data, a user health score that corresponds to the user's respiratory health; determining, using the user health score, a training program tailored to the user, wherein the training program is configured to improve the user's respiratory health; and transmitting, from the processor, a command signal to cause the respiratory device to implement the training program while the user is using the respiratory device.

In other aspects, the user health score and the training program are determined using the processor. In other aspects, the method further comprises transmitting the temperature data, pressure data, and SPO2 data to a cloud network; and determining, by the cloud network, the user health score and the training program.

Another example embodiment may include a method. The method may comprise, for example, receiving, at a processor in an electronics housing of a respiratory device, sensor data from one or more sensors integrated within the respiratory device, wherein the sensor data is associated with a breath of a user that is using the respiratory device; determining, using the sensor data, a user health score that corresponds to the user's respiratory health; determining, using the user health score, a training program tailored to the user, wherein the training program is configured to improve the user's respiratory health; transmitting, from the processor, a command signal to cause the respiratory device to implement the training program while the user is using the respiratory device; receiving, at the processor, updated sensor data associated with a second breath of the user; updating the user health score to determine an updated user health score based on the updated sensor data; updating the training program to determine an updated training program based on the updated user health score; and transmitting a command signal to cause the respiratory device to cancel the training program and implement the updated training program while the user is using the respiratory device.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

Another example embodiment may include a method. The method may comprise, for example, receiving, at a processor in an electronics housing of a respiratory device, CO2 data from a CO2 sensor, wherein the CO2 sensor is integrated within an air chamber of the respiratory device, and wherein the CO2 data is associated with a breath of a user that is using the respiratory device; receiving, at the processor, pressure data from a differential pressure sensor in the electronics housing, wherein the differential pressure sensor is located in the electronics housing, and wherein the pressure data is associated with the breath of the user that is using the respiratory device; receiving, at the processor, SPO2 data from a pulse oximeter sensor integrated within the air chamber, and wherein the SPO2 data is associated with the breath of the user that is using the respiratory device; determining, using the CO2 data, pressure data, and SPO2 data, a user health score that corresponds to the user's respiratory health; determining, using the user health score, a training program tailored to the user, wherein the training program is configured to improve the user's respiratory health; and transmitting, from the processor, a command signal to cause the respiratory device to implement the training program while the user is using the respiratory device.

BRIEF DESCRIPTION OF THE DRAWINGS

A further understanding of the nature and advantages of various embodiments may be realized by reference to the following figures. The features and components of the figures are illustrated to emphasize the general principles of the present disclosure. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

FIG. 10 illustrates a chart that includes example hypothetical data collected using sensors from a handheld respiratory device and calculated from that data, according to embodiments of the present technology.

FIG. 11 illustrates a chart that includes example hypothetical data, including risk scores and confidence scores, calculated using collected data from sensors at a handheld respiratory device, according to embodiments of the present technology.

FIG. 12 illustrates a chart=that includes an example training assigned to a user, according to embodiments of the present technology.

DETAILED DESCRIPTION

Figure 1A:
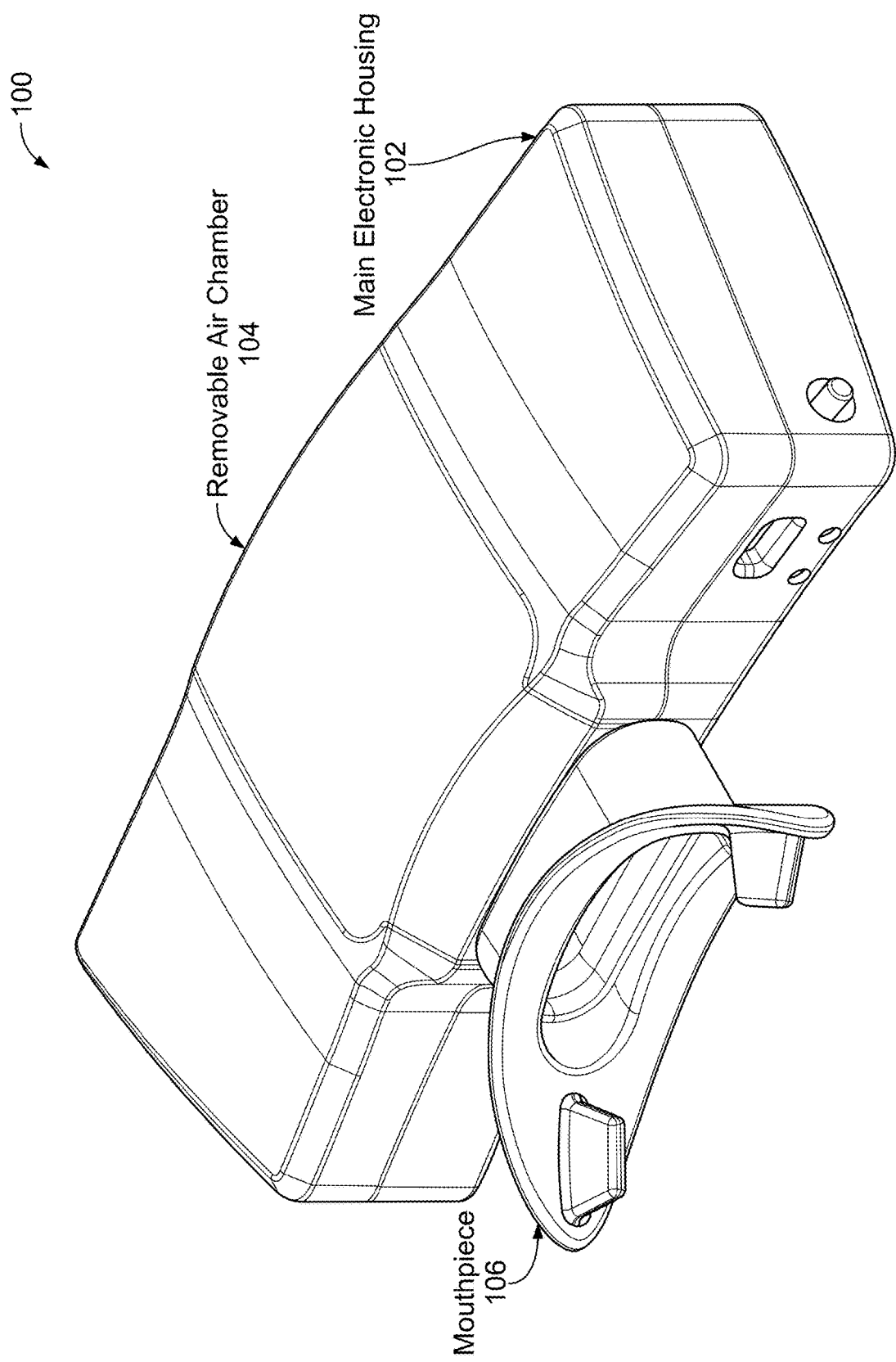
FIG. 1A illustrates a handheld respiratory device, according to embodiments of the present technology.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

This application relates to handheld respiratory diagnostic, training, and therapy devices and methods. More specifically, this application is directed to a device that collects data associated with a user's breathing using sensors, analyzes that data to determine time series readings of one or more health-related vitals, and generates trainings and therapies to assist the user in real time. The handheld respiratory device is a smart device in that the device may connect to other devices or networks via Bluetooth or other wireless protocols and may operate interactively with the user and autonomously to train and/or apply therapy to the user after analyzing the user's breaths. The handheld respiratory device may include a variety of inventive functionalities, including but not limited to a feedback loop to use current interaction with a user to continuously and in real-time update the user's respiratory profile, training, and therapy, dynamic training programs that may be calibrated over time as a user continues to use the device, determining and updating health scores for a user and confidence scores associated with the health scores based on a user's use of the device, which can be used by the user and/or health professionals to diagnose respiratory or other health problems for the user, and determining accurate pulse oximetry data collected through a lip, finger, or other body part of the user.

Each time a user breathes into the handheld respiratory device, the device collects data using its various sensors to determine biometrics associated with the user. For example, the device may collect data associated with, and ultimately determine, biometrics such as oxygen saturation levels (SpO2), body temperature, peak flow, and functional vital lung capacity. The data, or associated biometrics, may be recorded, geomarked, and sent to a cloud network for processing. Alternatively, the data may be processed within the device itself. The vital data points provide a real-time overview of general health, allowing agencies to both assess the ongoing health of individual patients as well as map and track the onset of disease, such as, for example, COVID-19, across vast demographics of the population.

The handheld respiratory device also includes an integrated breath resistance training module that offers personalized respiratory muscle training, one of the most impactful and cost-effective therapies for both the prevention and treatment of lung damage caused by respiratory illness. The handheld respiratory device may include resistance valves, gears that control the valves, and a stepper motor that controls the gears so as to open and close the valves for increasing and decreasing pressure applied to the user's breaths while breathing into the device. The device includes dynamic respiratory training programs that may be personalized to each individual user. For example, the device may learn (e.g., using machine learning) a user's habits and respiratory profile and provide a positive feedback system that encourages and tracks training progress. These dynamic training programs may be used to treat already-existing conditions or as a preventative health tool to prevent respiratory conditions from developing.

It should be understood by a person of ordinary skill in the art that the "handheld respiratory device" as described herein may also be a "respiratory device" that is not "handheld," but rather may be a desktop version or other non-handheld variety. For example, the scope of this application should be understood to include all embodiments as described herein but that are not "handheld" as described herein.

FIG. 1A illustrates a handheld respiratory device 100, according to embodiments of the present technology. Handheld respiratory device 100 may include, for example, a main electronics housing 102, an air chamber 104, and a mouthpiece 106, although handheld respiratory device 100 may include other components as well.

Main electronics housing 102 may include a variety of electronics that assist handheld respiratory device 100 to perform its functions. For example, main electronics housing 102 may include a pressure sensor and related components, such as an air chamber pressure tube, an ambient pressure reference tube, etc. The pressure sensor and related components may determine the pressure being applied to a user's breath by comparing the pressure of the user's breath traveling through the air chamber and ambient pressure. Main electronics housing 102 may also include an actuation motor that interfaces with resistance valves (located, for example, in removable air chamber 104) that may open and close to change the amount of pressure being applied to the user's ability to breath when breathing into the handheld respiratory device 100. Main electronics housing 102 may also include various circuitry that allows the handheld respiratory device 100 to make the determinations, calculations, and assist in other decisions as described above. Main electronics housing 102 also may be structurally configured to include an opening or space to receive and connect to removable air chamber 104 (and mouthpiece 106).

Removable air chamber 104 and mouthpiece 106 may connect to each other, and may connect to main electronics housing 102 as shown in FIG. 1. A user may place their mouth on/over mouthpiece 106 and breath into mouthpiece 106 so that their breath travels into mouthpiece 106 and then into air chamber 104. Mouthpiece 106 and air chamber 104 are configured so that a user's breath is captured in air chamber 104 and is available to other components in main electronics housing 102 and air chamber 104 and sensors included therein for capturing data associated with the user's breath. For example, components in main electronics housing 102 and air chamber 104 may collect data from the user's breath to determine the user's temperature, pulse oximetry, among others. Furthermore, removable air chamber 104 may also include resistance valves that may open and close to change the amount of pressure being applied to the user's ability to breath when breathing into the handheld respiratory device 100.

Figure 1B:
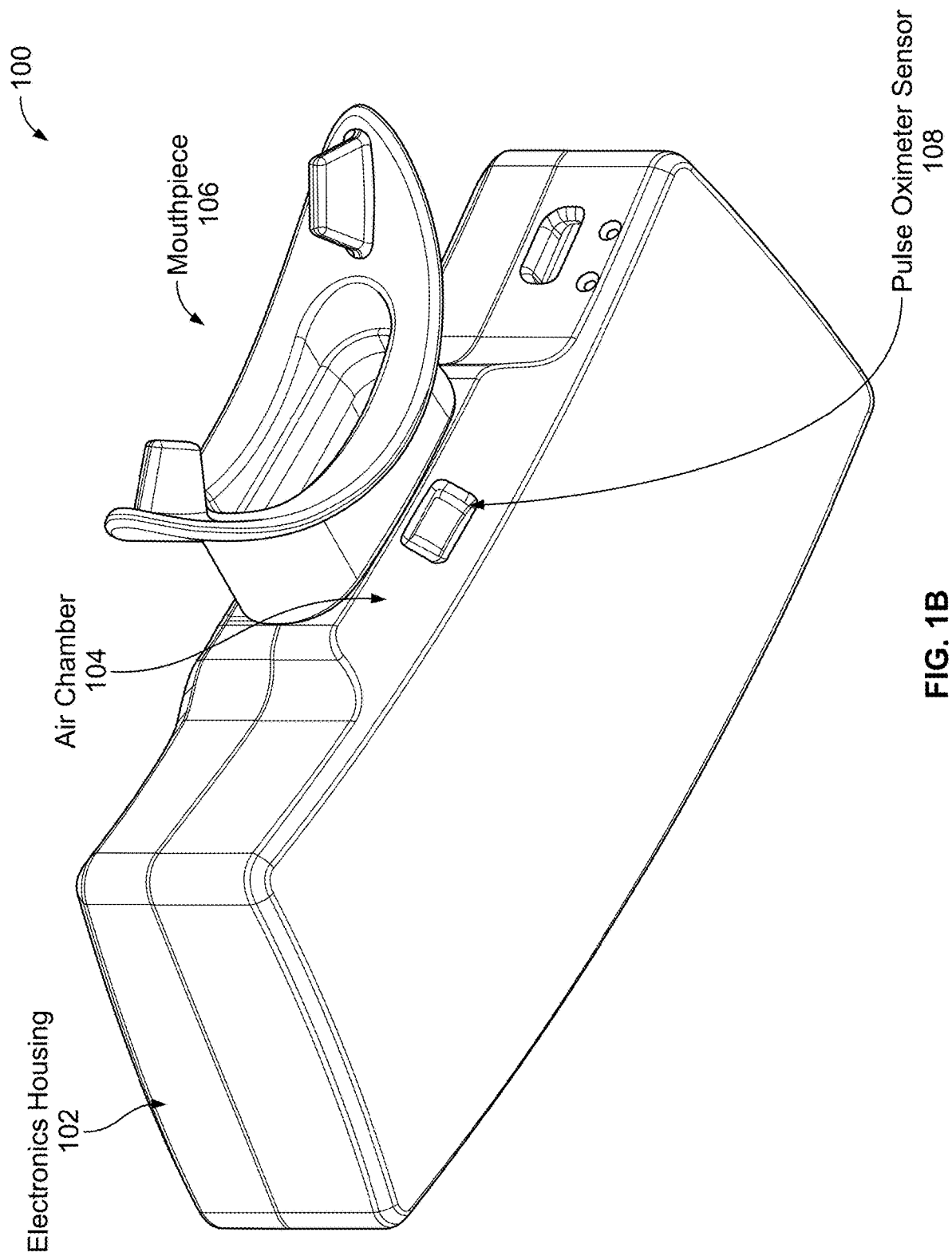
FIG. 1B illustrates an alternate view of a handheld respiratory device including a pulse oximeter sensor, according to embodiments of the present technology.

FIG. 1B illustrates an alternate view of handheld respiratory device 100 including a pulse oximeter sensor, according to embodiments of the present technology. Handheld respiratory device 100 includes a pulse oximeter sensor 108. Pulse oximeter sensor 108 may be positioned adjacent or close to mouthpiece 106, or may be a part of mouthpiece 106. Alternatively, pulse oximeter sensor 108 may be configured to be integrated into the structure of removable air chamber 104. Pulse oximeter sensor 108 is configured to rest against a user's lip when the user places their mouth on mouthpiece 106. Pulse oximeter sensor 108 may collect data from the user's lip, including, for example, pulse rate and oxygen saturation levels of the user. The inventors determined that handheld respiratory device 100, an example of which is shown in FIGS. 1A and 1B where the pulse oximeter sensor 108 contacts the user's lip when the user places mouthpiece 106 into their mouth, may allow the pulse oximeter sensor 108 to achieve optimal or substantially optimal accuracy when collecting data and computing pulse oximetry and oxygen saturation levels for the user. Specifically, collecting pulse oximetry data, for example, from a user's lip may provide accurate data and subsequent calculations, similar to other areas of the user's body, such as the user's finger, wrist, ear, and other locations around the user's body. In some embodiments of the present technology, the handheld respiratory device 100 may be adjusted to accommodate sensors on these other body parts to collect data regarding temperature, SpO2, and others.

The lips of the human body include thin layers of skin and capillaries directly underneath the thin layers of skin. Therefore, the accessible compilation of capillaries in the lip provide an ideal part of the body for infrared and/or near visible LEDs to transmit to and through the lips of the user. The reflective nature of the lips allow for reflectance pulse oximetry where a photodetector of the pulse oximeter sensor can accurately capture the transmitted light and collect accurate data associated with pulse oximetry of the user (as compared to, for example, the user's finger, which typically uses transmissive pulse oximetry). However, use of transmissive pulse oximetry may be used as well.

Figure 2:
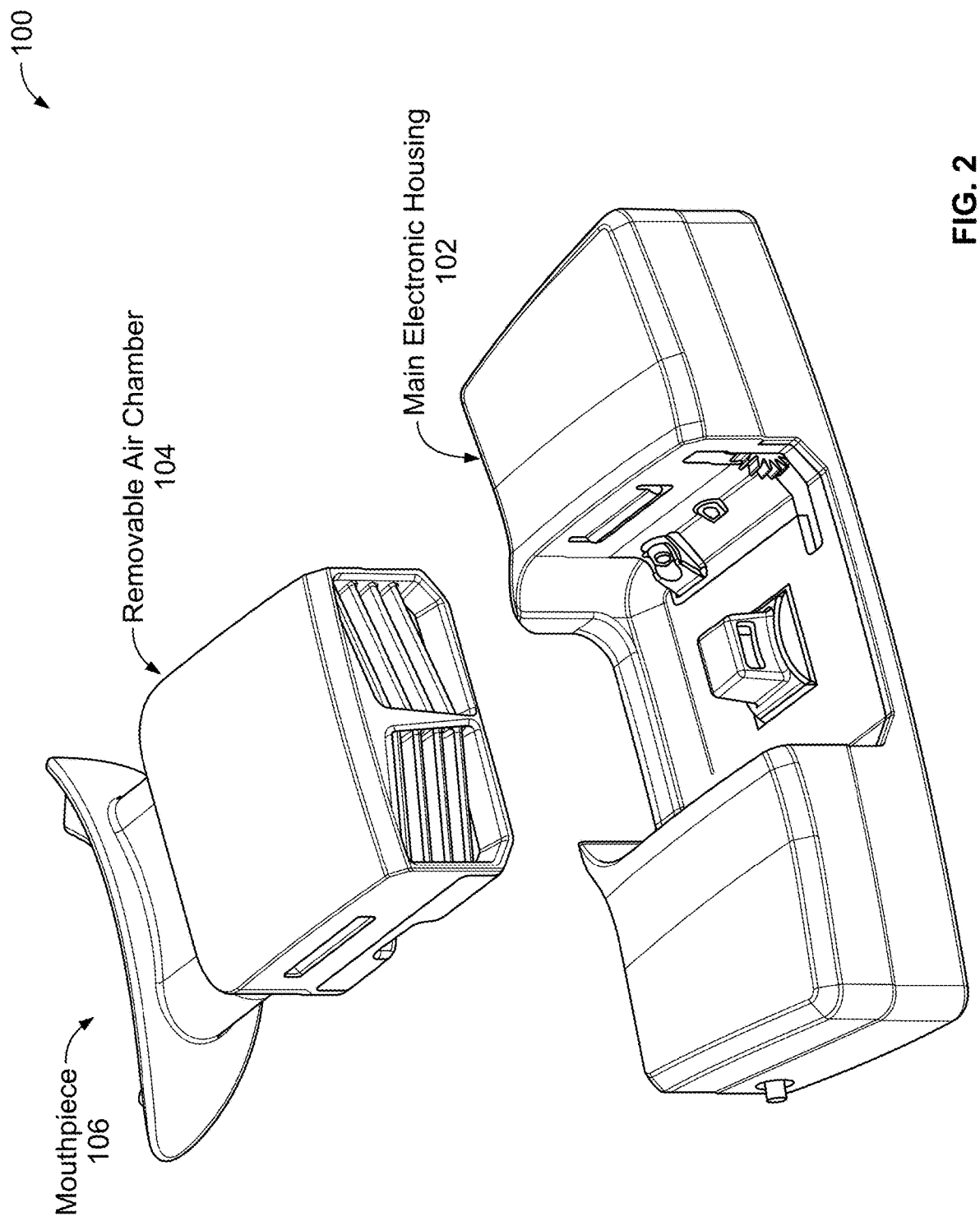
FIG. 2 illustrates an air chamber and mouthpiece of a handheld respiratory device removed from a main electronics housing, according to embodiments of the present technology.

FIG. 2 illustrates air chamber 104 and mouthpiece 106 of the handheld respiratory device 100 removed from the main electronics housing 102, according to embodiments of the present technology. As noted, air chamber 104 and mouthpiece 106 are removable from main electronics housing 102, as shown in FIG. 2. Mouthpiece 106 is also removable from air chamber 104 (not shown). Air chamber 104 and/or mouthpiece 106 may be removed from electronics housing 102 so that a user may wash air chamber 104 or mouthpiece 106 after use by one user and before use by a different user so as to prevent the spread of germs between users. As described further below, even though air chamber 104 and mouthpiece 106 of the handheld respiratory device 100 are removable from the main electronics housing 102, when air chamber 104 and/or mouthpiece 106 are connected to electronics housing 102, components from air chamber 104 and electronics housing 102 may contact or otherwise connect to each other such that the two components may pass air, data, or other items back and forth between each other. For example, orifices, tubes, etc. within air chamber 104 may overlap with orifices, tubes, etc. within electronics housing 102 so that air, such as breath from a user, may be passed from the air chamber 104 to electronics housing 102, and vice versa.

Mouthpiece 106 may be removable from the removable air chamber 104 so that mouthpiece 106 may be washed or disinfected over time or between uses by different users. Mouthpiece 106 may be comprised of molded soft plastic that is configured to removably attach to air chamber 104. In embodiments, including the embodiment shown in FIG. 1B, mouthpiece 106 does not include any sensors attached to it or integrated within it, including SPO2 sensor 108, which is integrated into the shell or outside structure of air chamber 104. However, in other embodiments, a sensor, such as the SPO2 sensor, may be connected to or integrated within mouthpiece 106 or other components of handheld respiratory device 100.

Figure 3:
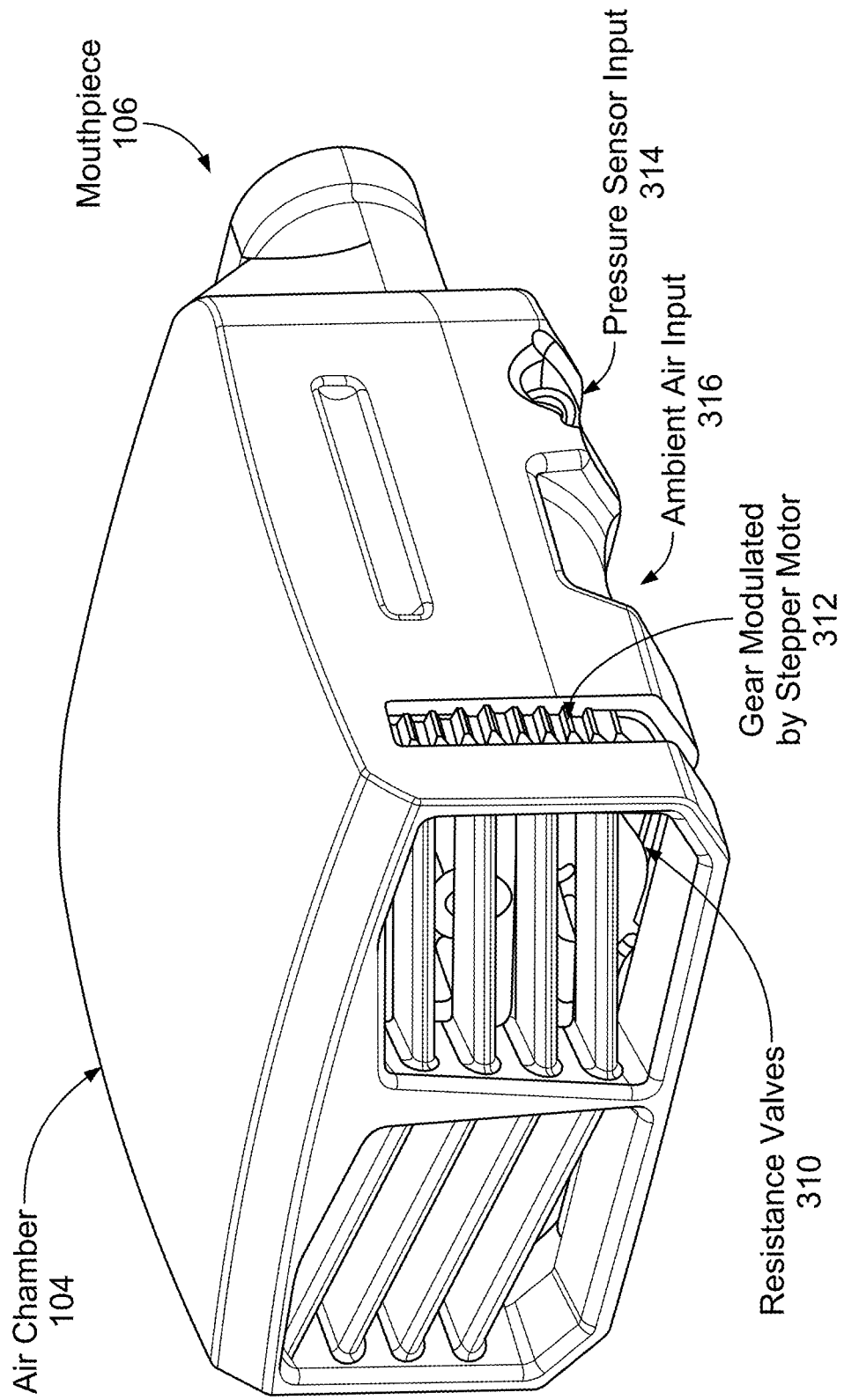
FIG. 3 illustrates a perspective view of an air chamber of a handheld respiratory device, according to embodiments of the present technology.

FIG. 3 illustrates a perspective view of the air chamber 104 of the handheld respiratory device 100, according to embodiments of the present technology. Air chamber 104 may include resistance valves 310 and gears 312 that may be modulated by a stepper motor (not shown). Air chamber 104 may also include a pressure sensor input 314 and an ambient air input 316.

To determine certain aspects of the user's respiratory health status, and to develop trainings and therapies for the user based on that respiratory health status, the handheld respiratory device 100 determines various biometrics to diagnose the user's respiratory health. For example, the handheld respiratory device 100 may determine a user's vital lung capacity, peak flow (i.e. the elasticity of respiratory muscles and the severity of pneumonia, for example), temperature (via exhaled breath thermometry), oxygen saturation (SpO2), heart rate, and exhaled carbon dioxide levels (pCO2, as measured in millimeters of mercury, or mmHg, which may be captured by a pCO2 sensor). To collect data associated with, and to use to calculate, these diagnostic biometrics, handheld respiratory device 100 includes various sensors. The sensors may include a pulse oximeter sensor (such as pulse oximeter sensor 108 shown in FIG. 1B), a pressure sensor, a temperature sensor, an oxygen (O2) sensor, a ketone sensor, a nitric oxide sensor, among others. The device may include fewer than all of these sensors, and may include additional sensors other than these.

For example, in some embodiments, handheld respiratory device 100 (or handheld respiratory device 1700 described herein) may not include a temperature sensor at all. In some embodiments, handheld respiratory device 100 (or handheld respiratory device 1700) may include a GPS sensor that allows the handheld respiratory device to use its location and collect data associated with its location (e.g., weather, temperature, altitude, climate, etc.) as part of calculating metrics as described herein, and/or developing trainings for a user. Furthermore, the GPS sensor may allow authorities (e.g., police, ambulance, etc.) to find a user if the handheld respiratory device 100 (or 1700) detects an urgent health condition of a user, such as a heart attack. Handheld respiratory device 100 may communicate directly with the authorities (e.g., if handheld respiratory device 100 or 1700 included WiFi, 4G/5G, or other communication protocol capabilities) or may communicate with a mobile device (e.g., via a short distance communication protocol, such as Bluetooth) to provide such communication functionality.

Figure 4:
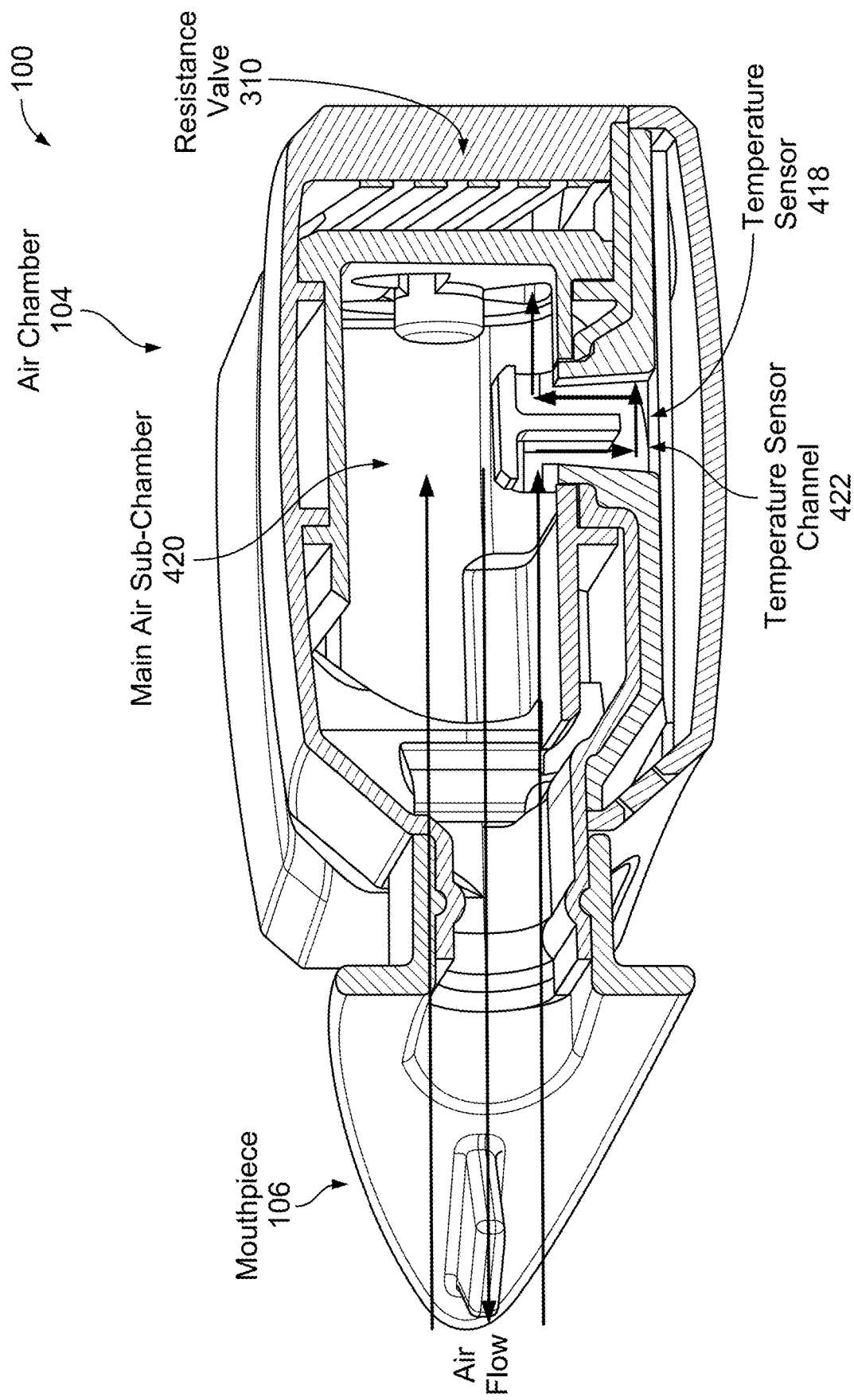
FIG. 4 illustrates a cross-sectional view of an air chamber and a temperature sensor located within the air chamber, according to embodiments of the present technology.

The temperature sensor may be located within the air chamber 104 as will be shown further with respect to FIG. 4. The temperature sensor may collect data associated with a user's body temperature using, for example, the user's peak temperature during breathing. The pressure sensor may be located within electronics housing 102 as will be shown further with respect to FIGS. 6-7, but could also be located within air chamber 104. The pressure sensor may determine or provide data to determine the differential pressure in the air chamber 104. For example, the range of pressures may be −5000 to +5000 Pascal (Pa). The pressure sensor may collect data associated with the user's peak flow and/or vital lung capacity. The collected data may assist the device in determining biometrics of the user.

The pressure sensor may also be connected to pressure sensor input 314 when air chamber 104 is connected to electronics housing 102. Pressure sensor input 314 may feed air from a user's breath, which is passing through the air chamber 104, to the pressure sensor. Specifically, when air chamber 104 is connected to electronics housing 102, pressure sensor input 314 may be adjacent to and overlap with an orifice in electronics housing 102 so that ambient air may pass through the orifice in electronics housing 102 and into pressure sensor input 314 for use by the pressure sensor. Air chamber 104 may also include an ambient air input 316 for the pressure sensor to receive ambient air. Data associated with air from the user's breath may be compared to ambient air to determine characteristics of the user's breath. These determinations may also assist the device in creating and implementing training and therapy to a user after data is collected and analyzed by the other sensors. For example, as will be described further below with respect to FIGS. 5-7, resistance valves 310, gears 312, pressure sensor input 314, and other related components from within air chamber 104 and electronics housing 102 may be used to control pressure applied to the user's breathing in handheld respiratory device 100 for training and therapy.

FIG. 4 illustrates a cross-sectional view of air chamber 104 and temperature sensor 418 located within the air chamber, according to embodiments of the present technology. Air chamber 104 may include a temperature sensor 418 to record the temperature of the breath of a user at different points in time. Collecting temperature data at temperature sensor 418 may allow the device to determine if the user has a fever, which may be a factor in determining whether the user has certain conditions, such as COVID-19. Temperature sensor 418 may be located within a channel or path within air chamber 104, such as temperature sensor channel 422. Temperature sensor 418 may be electronically connected to the rest of handheld respiratory device 100 via a printed circuit board (PCB) located within temperature sensor channel 104 as shown in FIG. 4. However, temperature sensor 418 may also be located within air chamber 104 and not within a separately walled off channel or path as shown in FIG. 4. Instead, temperature sensor 418 may be located within the main air chamber of air chamber 104 in direct path of air flow. Furthermore, temperature sensor 418 may be electronically connected to handheld respiratory device 100 via a main PCB that also has other components attached to it as opposed to being connected to its own separate PCB as shown in FIG. 4.

As noted, a user may breathe into air chamber 104 of handheld respiratory device 100 via mouthpiece 106 during an exhale. Air from the user's breath travels through mouthpiece 106 and through air chamber 104. Air from the user's breath may then branch into two separate sub-areas within air chamber 104, including main air sub-chamber 420 and temperature sensor channel 422. Temperature sensor channel 422 is configured to receive air flow from the user's breath so as to feed the air flow over/past temperature sensor 418 so that temperature sensor 418 may collect data associated with the air and determine the body temperature of the user based on the user's breath. After the air leaves temperature sensor channel 422, the air may re-enter main air sub-chamber 420 and/or may exit air chamber 104 through resistance valves 310. Furthermore, when a user inhales, the user's breath may pull air from the exterior of air chamber 104 and through resistance valves 310. The inhale air may then branch into the two separate sub-areas within air chamber 104, main air sub-chamber 420 and temperature sensor channel 422, but flowing in the opposite direction as during an exhale as described above (or, in other words, in the opposite direction as the air flow arrows shown in FIG. 4). Although temperature sensor 418 may not know which direction air is traveling, such as to determine whether air passing over temperature sensor 418 is from an inhale or an exhale, temperature sensor 418 or other components of handheld respiratory device 100 (e.g., microprocessor) may determine the direction or whether air is from an inhale or exhale based on the increases and decreases in temperature throughout a breath.

Temperature sensor 418 collects data on a continuous basis throughout the breaths of the user on both inhale and exhale, and across multiple breaths. Collecting continuous data associated with temperature of the user allows the device to generate a time series of data so as to have access to temperature readings throughout the breaths of the user, compare temperatures at different points in time throughout the user's one or more breaths, and determine the actual or core temperature of the user using those breaths. After collecting various temperature data points over time throughout the inhale and exhale of a single breath, or across inhales and exhales of multiple breaths, handheld respiratory device 100 may use that data to determine a core temperature of the user. For example, handheld respiratory device 100 may analyze the temperature data collected across one breath or across multiple breaths and determine the maximum temperature recorded across the breaths, and determine that the maximum breath is the core body temperature of the user. Alternatively, the handheld respiratory device 100 may determine the maximum temperature within each individual breath, and then compare the maximum temperatures from different breaths. The core body temperature of the user may be determined to be the maximum (or the average, or a different analysis) of the maximum temperatures from different breaths. In another example, handheld respiratory device 100 may only analyze temperature data from a certain portion of the user's breath, such as, for example, the bottom ⅓ of each exhale breath. The device may only use a certain portion of the data from the user's breath(s) so as to be more efficient with data collection, data analysis, etc. However, other portions may be selected.

After a core body temperature has been determined by the device, the core body temperature may be displayed on a graphical user interface (GUI) that is integrated into or otherwise electronically connected to handheld respiratory device 100. The GUI may also be a part of a separate device, such as a smartphone, tablet, smartwatch, or others. Alternatively, the core body temperature may be transmitted to a user at a user device (e.g., smart phone, smart watch, tablet, computer, etc.). The core body temperature may also be tracked over time and displayed on a graph or other time series presentation. For example, the peak temperature determined from each breath taken by the user may be graphed and updated over time. The core body temperature may also be used in determining other biometrics as described herein, or may be a factor in determining whether the user has a condition, such as COVID-19. The peak temperature in a given breath may correlate to the core body temperature of the user during that breath. However, to obtain more accurate readings, peak temperature may be collected for each breath, and then the peak temperature across those breaths may be a more accurate representation of the user's core body temperature as compared to any individual reading for any single breath.

Although temperature sensor 418 may collect temperature data and analyze that data to determine a peak temperature that represents core body temperature of the user, the determined peak temperature may not be the actual core body temperature of the user. Instead, the determined peak temperature may be proportional to the core body temperature of the user due to the thermal mass of the sensor and its electronic and physical connection to a PCB or other electronics within the main electronics housing 102. However, this proportional difference may be fixed with a linear correction, such as by applying a correction offset to the "peak temperature" determined by the temperature sensor 418, which would yield the core body temperature of the user.

Figure 5:
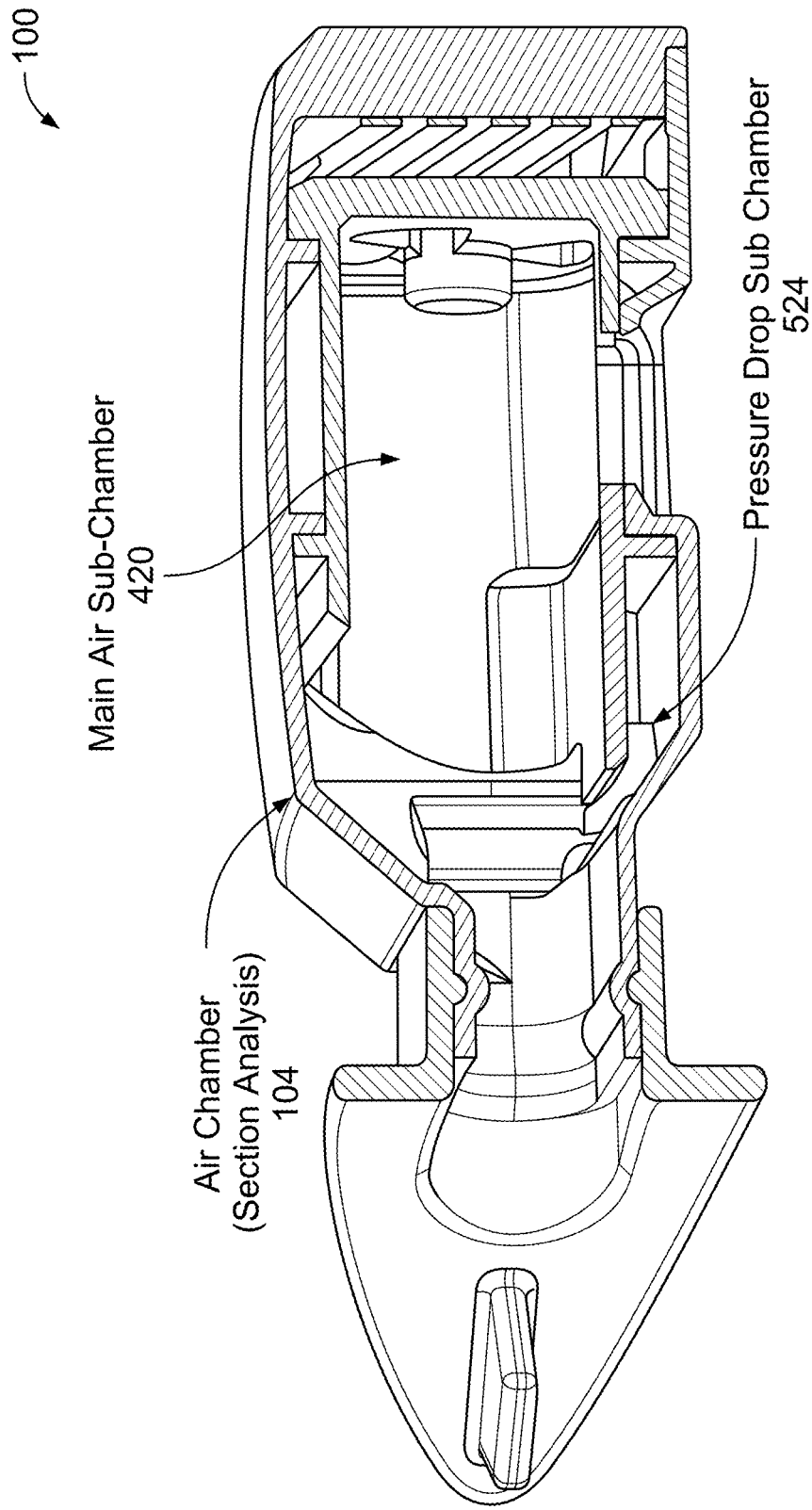
FIG. 5 illustrates a cross-sectional view of an air chamber and a pressure sub chamber located in air chamber, according to embodiments of the present technology.

FIG. 5 illustrates a cross-sectional view of air chamber 104 and pressure sub chamber 524 located in air chamber 104, according to embodiments of the present technology. As noted, to determine certain aspects of the user's respiratory health status, and to develop trainings and therapies for the user based on that respiratory health status, the handheld respiratory device 100 determines various biometrics to diagnose the user's respiratory health using a pressure sensor and other sensors. For example, the handheld respiratory device 100 may determine a user's vital lung capacity, peak flow, temperature, oxygen saturation, heart rate, and exhaled carbon dioxide levels using the sensor data. The pressure sensor may be located within electronics housing 102, and the pressure sensor may collect data associated with the user's peak flow and/or vital lung capacity. As noted, the pressure sensor may also be connected to pressure sensor input 314 when air chamber 104 is connected to electronics housing 102. Pressure sensor input 314 may feed air from a user's breath, which is passing through the air chamber 104, to the pressure sensor in electronics housing 102. Air chamber 104 may also include a pressure sub chamber 524. Pressure sub chamber 524 includes a portion of air chamber 104 that is walled off from the rest of air chamber 104. Pressure sub chamber 524 also allows the flow of air (e.g., from a user's breath) from pressure sub chamber 524 to the pressure sensor in electronics housing 102 when air chamber 104 is connected to electronics housing 102. Pressure sub chamber 524 receives air from a user's breath, similar to the main part of air chamber 104, but is walled off from the rest of air chamber 104 so that the air in pressure sub chamber 524 is stabilized and not susceptible to the turbulence of air in main air sub-chamber 420 due to the turbulence caused by the breath of the user. However, since pressure sub chamber 524 is a portion of main air sub-chamber 420 and is similarly receiving air from a user's breath, it will have the same or substantially the same pressure as air in main air sub-chamber 420. The presence of pressure drop sub chamber 524 holds non-turbulent air so that the differential pressure sensor can achieve more precise readings of pressure.

Figure 6:
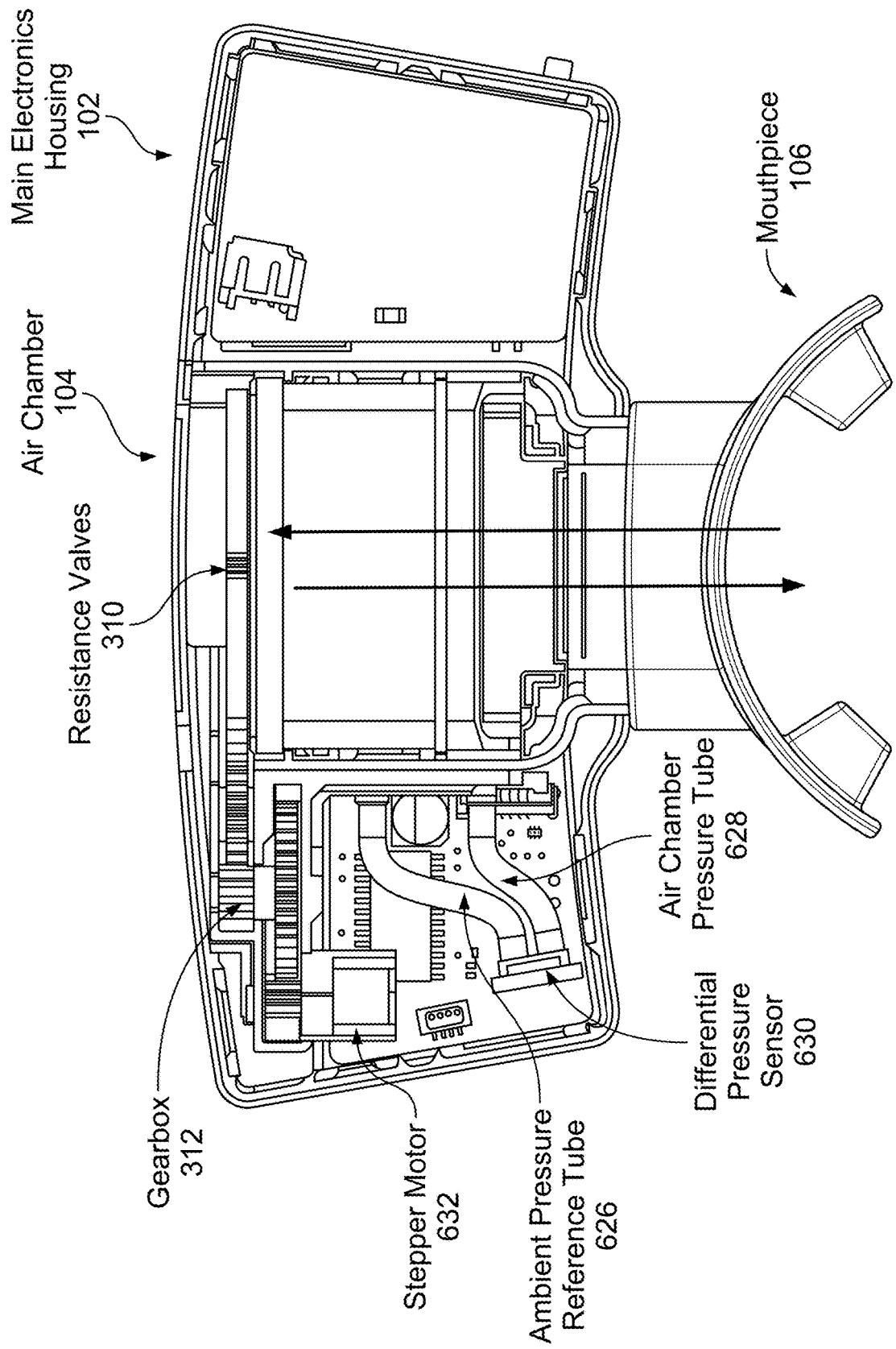
FIG. 6 illustrates a top view of a main electronics housing including a pressure sensor system, according to embodiments of the present technology.

FIG. 6 illustrates a top view of main electronics housing 102 including a pressure sensor system, according to embodiments of the present technology. Main electronics housing 102 includes a differential pressure sensor 630. Pressure sensor 630 may be used for determining certain biometrics to help determine if a user has one or more conditions that can be treated, such as COVID-19. For example, the pressure sensor 630 may be used to determine peak flow and vital lung capacity of the user. Peak flow and vital lung capacity are good metrics for overall lung status/ health. Pressure sensor 630 can collect data from a person's breath so that handheld respiratory device 100 can determine the person's peak flow and vital lung capacity.

Peak flow represents a person's ability to breathe air. In other words, peak flow measures how hard a user can inhale or exhale, or the velocity of how hard a user can force air in or out of the user's lungs. Pressure sensor 630 determines pressure (e.g., in pascals). The peak flow rate may be calculated by measuring the pressure difference between ambient pressure and chamber pressure and multiplying that pressure difference with a constant number derived by the shape and volume of the air chamber. The unit of flow may be Liters per Second (Us). An algorithm may be applied to the pressure data collected by pressure sensor 630 to determine peak flow. The algorithm may take into account the size and shape of the air chamber from which pressure sensor 630 is pulling the air from to capture its pressure reading data. The algorithm may yield a data spectrum with an amount of flow from each moment in time at which a data sample was taken by the pressure sensor 630. The peak flow may be determined by determining the highest flow number during a breath. In some embodiments, peak flow may be determined by determining the highest flow level during the first ⅓ of a user's inhale. Longer or shorter amounts of time may also be used across which a peak flow is determined.

Vital lung capacity is the maximum amount of air a person can expel from their lungs after a maximum inhalation. In other words, vital lung capacity is how much air can physically fit into a person's lungs. As determined by the pressure sensor, vital capacity (or vital lung capacity) may determine the integration of flow over time. Vital lung capacity may be determined by compiling flow amounts over a period of time, such as across an entire exhale of a user, to determine how much air was moved (i.e. exhaled) by the user during that breath. Specifically, vital lung capacity may be calculated by integrating the flow rate over time. In other words, each flow reading sample may be summed over however long it takes to exhale a breath. This calculation represents a calculated volume of air that has moved through the air chamber. Vital lung capacity may be measured in Liters. As an example, a typical human has an average lung capacity of 6 liters.

Resistance valves 310 may provide at least two purposes. First, resistance valves 310 may provide a way to increase and/or decrease air resistance in order to give the user a lung workout by increasing the effort required to breathe through the device. Second, resistance valves 310 may serve as a pressure drop element for the differential pressure sensor 630. For example, the valves may act as an orifice plate flow meter.

Resistance valves 310 (in conjunction with data from differential pressure sensor 630) may assist handheld respiratory device 100 in providing training or therapy for a user by adjusting the pressure of inhaled and exhaled air through handheld respiratory device 100. This training and/or therapy can expand the lungs and improve respiratory health, and can significantly improve sleep apnea, snoring, asthma, hypertension, and other health conditions.

Resistance valves 310 may also serve as a pressure drop element for the differential pressure sensor 630. For example, in some embodiments, when the resistance valves 310 are fully or substantially fully open, the valves are still blocking a portion of the air stream from a user's breaths. This causes a high-pressure zone within the air chamber 104 (as compared to ambient), which the pressure sensor detects. A direct relationship exists between the pressure within the air chamber and the flow rate, i.e., the "harder" a user breathes, the higher the pressure and faster the flow within the air chamber. The flow rate is determined by capturing the differential pressure and correcting based on the valve position. In some embodiments, when the resistance valves 310 are fully or substantially fully closed, it is much more difficult for a user to breathe into the device when the resistance valves are closed. In other words, a user must exert more effort to obtain the same flow rate when the resistance valves are more closed, which the differential pressure sensor can determine based on the data it collects and calculates. However, the algorithm used to determine flow takes into account the position of the resistance valves in order to accurately convert pressure to flow.

Main electronics housing 102 includes a gearbox 312 with gears, resistance valves 310, and a stepper motor 632. Even though main electronics housing 102 is shown to include a stepper-type motor, other types of motors could be used instead of a stepper motor. When a user exhales at mouthpiece 106, their breath moves through mouthpiece 106 and into air chamber 104 of handheld respiratory device 100. Air from the user's breath travels through mouthpiece 106 and through/into air chamber 104. When a user inhales at mouthpiece 106, air is pulled through resistance valves 310 and into air chamber 104 of handheld respiratory device 100. The difficulty of a user inhaling or exhaling at mouthpiece 106 is dependent upon how much pressure is applied to their breath by handheld respiratory device 100. The amount of pressure applied to a user's breath is determined by how free the air flow is between outside the device to inside the device as it passes through resistance valves 310. The freedom of air flow through resistance valves 310 is dependent upon how much of the opening between the outside of the resistance valves and the air chamber 104 is covered by the resistance valves 310. Therefore, to change the amount of pressure on a user's breath can be changed by opening and closing resistance valves 310. Gearbox 312 and its associated gears are connected to resistance valves 310 so that they can open and close the resistance valves 310 when they move themselves. Stepper motor 632 is connected to the gears to move the gears so as to control resistance valves 310. Stepper motor 310 is powered by DC current being sent to stepper motor 310 by a controller (which may be, for example, implemented as software, the instructions for which may be executed by a microcontroller in the electronics housing). The controller may provide, for example, pulses of current to the motor to control the speed and torque of the motor, which controls the gears, and ultimately the resistance valves 310.

The opening and closing of resistance valves to change the pressure applied to a user's breath may be stepped up or down in as small or large intervals as necessary to calibrate the pressure. Stepper motor 310 may be capable of certain resolution of intervals, but a different type of motor (e.g., servo motor) may be used to achieve higher resolution micro-stepping to accomplish finer adjustments of the valves, and therefore finer adjustments of the pressure to match the desired pressure for handheld respiratory device 100.

Frequency of testing of the pressure to determine how often to adjust the motor 310, and therefore the gears and the valves 310, may be calibrated on handheld respiratory device 100. For example, a user may select, either using handheld respiratory device 100 or using an external control device (e.g., application on a smartphone connected to handheld respiratory device 100 via Bluetooth), may select the frequency of testing the pressure and frequency of calibration of the valves 310. However, for example, testing of the pressure may occur every 10 or 20 ms on a continuous basis.

Each time the user inhales or exhales, air passes through air chamber 104, and therefore passes across any sensors located in air chamber 104, or across sensors located in main electronics housing 102 that have access to air passing through air chamber 104. For example, pressure sensor 630 is connected to air chamber 104 via air chamber pressure tube 628, which feeds air to pressure 630 from air chamber 104. Air chamber pressure tube 628 allows for one side of the differential pressure sensor 630 to be pressurized with the pressure from air chamber 104. As described with respect to FIG. 3, air chamber 104 may include an ambient air input 316 for the pressure sensor to receive ambient air. Ambient air input 316 may be connected to a tube, such as ambient pressure reference tube 626, to bring ambient air to pressure sensor 630. Ambient pressure reference tube 626 allows for the other (ambient) side of the differential pressure sensor 630 to be pressurized with the pressure from outside the device, or the pressure applied by the ambient air (which may be zero or close to zero, or may be non-zero). Pressure sensor 630 may collect data associated with both ambient and user-produced air that are fed past differential pressure sensor 630. Data associated with air from the user's breath, as received from air chamber 104, may be compared to data associated with ambient air, as received from outside of the device, to determine a pressure differential, or the current pressure being applied to the user's breath by handheld respiratory device 100.

Pressure sensor 630 may also be used to detect direction of air flow (e.g., whether air flow is due to an inhale or exhale). Although pressure sensor 630 may not directly or initially know which direction air is traveling, such as to determine whether air passing over pressure sensor 630 is from an inhale or an exhale, pressure sensor 630 and/or other components of handheld respiratory device 100 (e.g., microprocessor) may determine the direction or whether air is from an inhale or exhale based on the increases and decreases in pressure throughout a breath.

As noted, pressure sensor 630 may also assist handheld respiratory device 100 in providing training or therapy for a user by adjusting the pressure of inhaled and exhaled air through handheld respiratory device 100. To initiate a training for a user, a predetermined amount of pressure may be chosen by handheld respiratory device 100. The predetermined amount of pressure may be based on the user's current health and/or future health objectives. For example, a training may include a variety of different predetermined amounts of pressure that are applied subsequent to each other over a period of time to improve the respiratory health of the user. In a more specific example, a user may be prompted by handheld respiratory device 100 to take a specific number of breaths while handheld respiratory device 100 applies a specific amount of pressure to the user's breath, followed by another specific number of breaths and a different amount of pressure, and so on. This type of training may improve the user's lung capacity or other biometrics. In order for handheld respiratory device 100 to keep applying a specific pressure consistently over a period of time (e.g., the time that it takes for the user to take the specific number of breaths required by a step in the training), handheld respiratory device 100 needs to calibrate the pressure being applied in real time. Real-time calibration of the pressure can be accomplished using a PID controller and a control feedback loop, as described further below.

As noted, stepper motor 310 is powered by current being sent to stepper motor 310 by a controller. The controller may provide, for example, pulses of current to the motor to control the speed and torque of the motor, which controls the gears, and ultimately the resistance valves 310. The controller may be, for example, a proportional integral derivative (PID) controller. The PID controller may be implemented as software and/or firmware stored on a storage device within handheld respiratory device 100, or more specifically within electronics housing 102. The software/firmware may be run on a microcontroller or the main processor of the device. The PID controller may be used to create a control loop including feedback. The control loop may be used to calibrate the pressure system in real time to calibrate the pressure being applied to a user while breathing, such as during a training. For example, a user of the handheld respiratory device 100 may breathe through mouthpiece 106 during a training cycle as instructed by handheld respiratory device 100, and the training may include a current predetermined pressure being applied to user while the user is breathing. However, while the user is breathing, differential pressure sensor 630 collects ambient air data and breath air data from ambient pressure reference tube 626 and air chamber pressure tube 628, respectively, and determines that the pressure being applied to the user in a current breath is different than the predetermined pressure assigned as part of the training.

To determine if the pressure needs to be calibrated, the difference between the predetermined training pressure (e.g. between +5000 and −5000 pascals) and the actual pressure of the current breath may be compared to a threshold difference. If the difference is greater than the threshold difference, the handheld respiratory device 100 determines that calibration is necessary. The PID controller may then transmit a control signal to stepper motor 632 to adjust the speed of the gears, which subsequently will open or close resistance valves 310 a specifically calculated amount to change the pressure as necessary to meet the predetermined training pressure.

Calibration of the pressure being applied to a user during breathing may be applied immediately (e.g., as soon as possible, such as during the same breath), or may be applied to the next breath in the training or cycle. For example, if a current pressure is determined during a certain breath using data from that breath, and the device determines that the pressure needs to be calibrated, the device may implement the adjustment towards the end of that breath or in between breaths so that the new adjusted pressure is applied to the next breath. Then, since the feedback loop is continuous, data from that next breath will be captured, analyzed, and used for a subsequent calibration for the next breath after that, and so on.

Figure 7:
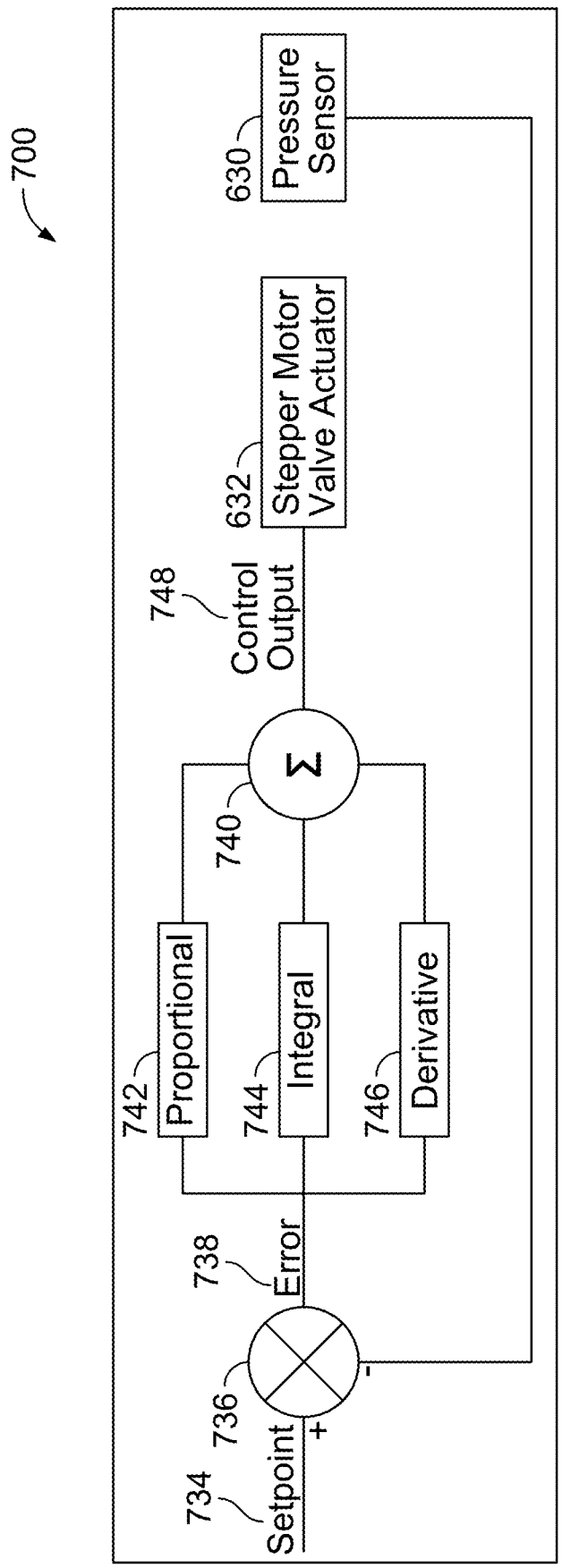
FIG. 7 illustrates a block and flow diagram showing a PID controller feedback loop, according to embodiments of the present technology.

FIG. 7 illustrates a block and flow diagram 700 showing the PID controller feedback loop, according to embodiments of the present technology. The PID controller is configured to calibrate the motor, gears, and resistance valves so as to keep the pressure being applied to a user's breath at a specific predetermined pressure amount. The predetermined pressure amount, or setpoint (e.g., setpoint 734), may be determined as part of a training (and the training may be selected after collecting diagnostic data and analyzing that data to determine the user's health state, such as a health score, as is described further herein). The setpoint in this case is the predetermined target pressure that the system is using the PID controller to maintain over time. For example, as a user inhales into the device, the resistance valves close and the internal pressure of the chamber in the device drops because a vacuum is forming within the chamber. As the pressure hits the target setpoint, the resistance valves open to stabilize the pressure at the setpoint amount. Then, the valves may be adjusted and open or close to maintain the pressure at the target setpoint. The PID controller feedback loop uses that setpoint and data from the pressure sensor 630 to calibrate the stepper motor, which adjusts the gears, which adjust the resistance valves.

As shown in FIG. 7, data from pressure sensor 630 may be compared to setpoint 734 at operator 736. The result of that comparison is error 738, which is the difference between the predetermined target setpoint and the current, or real-time, pressure readings determined at pressure sensor 630. After error 738 is determined, the PID controller determines how to control the stepper motor and related components of the resistance system to adjust the pressure to meet the setpoint 734.

PID controller includes three portions or terms, including proportional 742, integral 744, and derivative 746, each of which may include a separate algorithm that addresses a separate portion of the PID controller software. Alternatively, the separate terms may represent different philosophies for how to calibrate the motor, and then used in conjunction to determine the most accurate control signal to send to the motor. Proportional term or control 742 may control the motor current to be set in proportion to the existing error. Therefore, the proportional term may address smaller tweaks to the motor based on smaller errors. Integral term 744 may increase action in relation to the error and also the time for which the error persisted. In other words, integral term 744 may take into account information or results from past loops. Therefore, if applied force is not enough to bring the error to zero, this force will be increased as time passes. Derivative term 746 may not consider the error at all or bring the system to the setpoint by itself, but instead considers the rate of change of error by dampening the force applied.

Summer 740 may then compile or otherwise analyze proportional term 742, integral term 744, and derivative term 746 to determine a control output 748 that will be sent to the stepper motor 632. The control output 748 may include a finally determined calibration amount for that control loop based on the three components of the PID controller. As noted, this result may then be used in future loops as part of the decision for calibration in those loops. Using this past data and current setpoint and pressure data for each loop, the PID controller (with the pressure sensor) continuously updates and calibrates the pressure feedback system over time.

Figure 8:
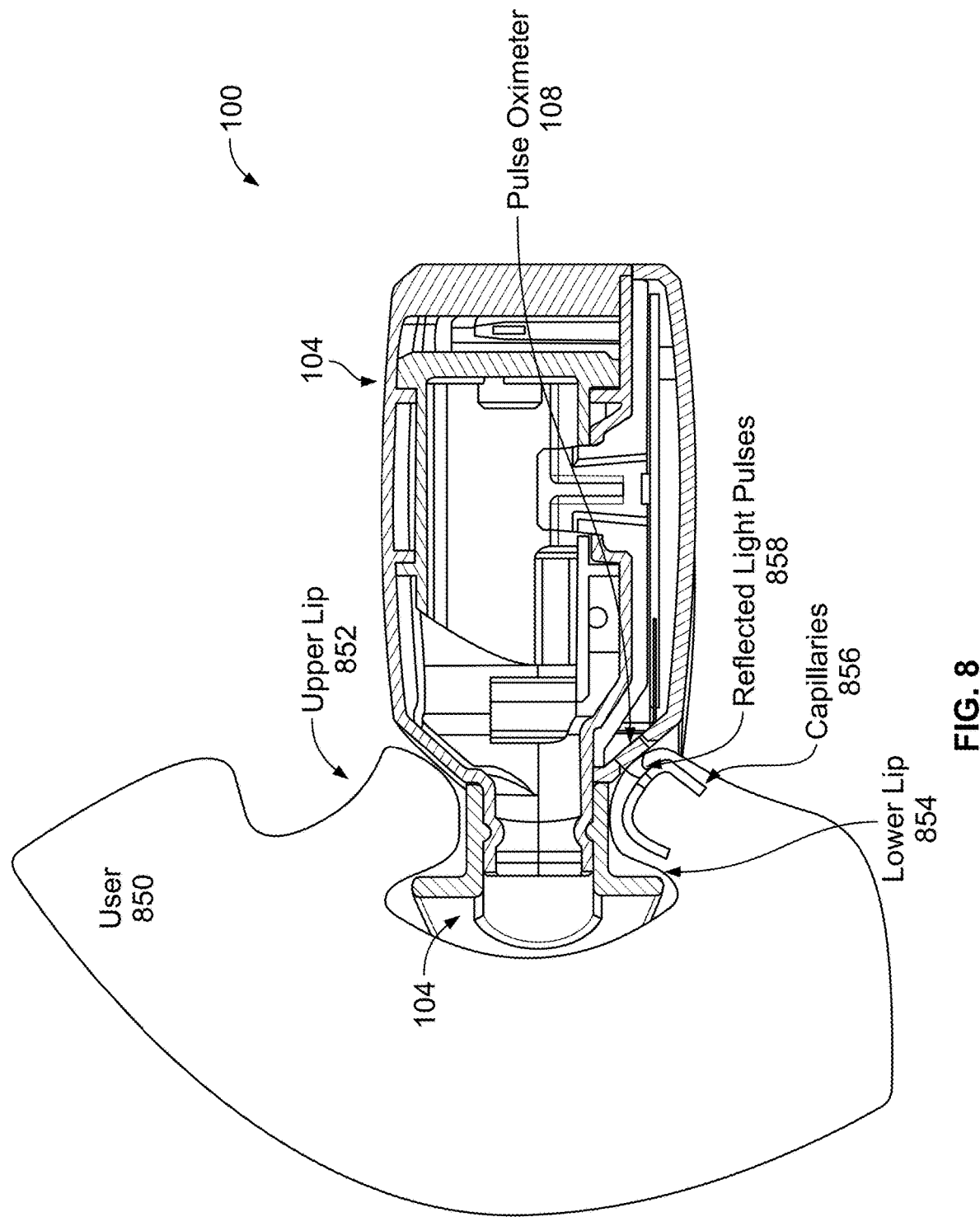
FIG. 8 illustrates a user using a handheld respiratory device including a pulse oximeter sensor, according to embodiments of the present technology.

FIG. 8 illustrates a user 850 using handheld respiratory device 100 including pulse oximeter sensor 108, according to embodiments of the present technology. User 850 has upper lip 852 and lower lip 854, which the user wraps around mouthpiece 106 to use handheld respiratory device 100 by exhaling into handheld respiratory device 100 and inhaling from handheld respiratory device 100. A component of pulse oximeter sensor 108 is situated on an area of removable air chamber 104 so as to connect with the user's lower lip 854 (in other embodiments, pulse oximeter sensor 108 may be located elsewhere, such as on a portion of air chamber 104 so as to connect with the user's upper lip 852) when the user's mouth is over mouthpiece 106. Pulse oximeter sensor 108 captures data from user 850 by using a red LED and/or an infrared LED (other types of LEDs may also be used as a part of pulse oximeter sensor 108) to reflect light off of tissues of the user's lip lower 854. The LEDs may reflect from portions of the lip such as the user's blood and capillaries inside the lip. Pulse oximeter sensor 108 may then capture spikes (e.g. peaks and/or troughs) related to blood flow. Pulse oximeter sensor 108 may capture this raw data in the form of a reflected spectrum, which is proportional to the amount of oxygen in the blood. For example, spikes in the data spectrum may represent high or low amounts of oxygen because blood with low oxygen may reflect the LEDs less, while blood with more oxygen may reflect the LEDs more, relative to each other.

Pulse oximeter sensor 108 may also include a second component different than the one that connects to the user's lip. This second component may receive the raw data captured by the first component and process the raw data and output biometrics associated with the user, such as oxygen saturation and heart rate. The pulse oximeter sensor 108 may also determine the user's heart rate variability, blood pressure, and other biometrics that may assist handheld respiratory device 100 determine if the user has certain health conditions, such as COVID-19. For example, while a healthy user may have an oxygen saturation of over 90%, if the user has an oxygen saturation below 90%, then that biometric may be an indication that the user has a health condition. For example, this indication may be combined with other indications from other biometric data to determine a health score, as described herein.

Figure 9:
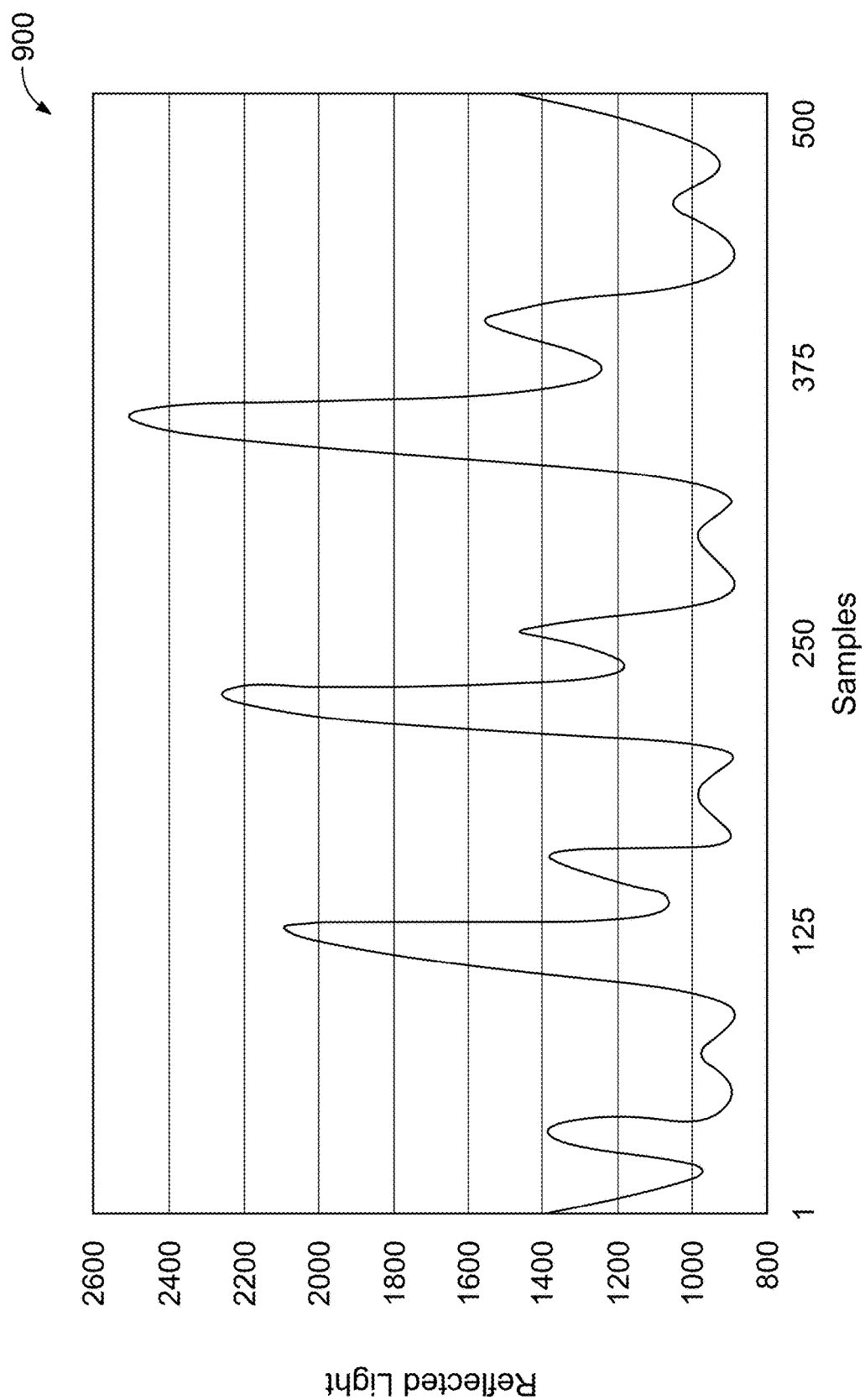
FIG. 9 illustrates a graph that represents data captured from a pulse oximeter sensor at the lip of a user, according to embodiments of the present technology.

FIG. 9 illustrates a graph 900 that represents data captured from pulse oximeter sensor 108 at the lip of a user, according to embodiments of the present technology. Graph 900 includes an x-axis that represents samples taken, where a sample includes data from a reflection of an LED light from pulse oximeter sensor 108 as reflected by the lip of a user. In other words, as the number of samples grow, so does time since the samples were captured in chronological order as represented on graph 900. Graph 900 also includes a y-axis that represents the amount of light reflected as captured by pulse oximeter sensor 108. The maximum amount of reflected light at each spike may represent the user's blood oxygen level at a particular point in time, or in other words at the point in time when the particular sample representing that peak maximum reflection was taken. As the amount of reflected light increases, such as in the higher peaks shown in graph 900 (e.g., peak 964 as compared to peak 962, and peak 966 as compared to peak 964 or peak 962), the blood oxygen level of the user as determined by the pulse oximeter increases as well.

FIG. 10 illustrates a chart 1000 that includes example hypothetical data collected using sensors from handheld respiratory device 100 and calculated from that data, according to embodiments of the present technology. Handheld respiratory device 100 may collect various types of data associated with a user when the user breaths into and out of handheld respiratory device 100. As noted, handheld respiratory device 100 has multiple sensors that collect data associated with the user and the user's breathing, and the data is analyzed to determine biometrics associated with the user's respiratory health. In embodiments, handheld respiratory device 100 includes a temperature sensor for collecting temperature data associated with a user's core body temperature. In embodiments, handheld respiratory device 100 has a pulse oximeter (SpO2) sensor that collects data associated with heart rate, oxygen saturation, and other metrics. In embodiments, handheld respiratory device 100 has a pressure sensor that collects data associated with pressure differential between the user's breath and ambient air, peak flow, vital lung capacity, among others. In embodiments, handheld respiratory device 100 includes a pCO2 sensor to collect data associated with partial pressure CO2. These various data may be used to determine biometrics associated with a user over time. An example set of data associated with biometrics are shown in chart 1000 for user Joe G.

The various sensors within handheld respiratory device 100 may be used for various tools, including diagnostic tools, training tools, and therapeutic tools. First, diagnostic tools may include determining the biometrics described herein for a user over a period of time so that handheld respiratory device 100 can diagnose whether the user has certain conditions, such as COVID-19. The biometrics may be used to generate a dynamic health score associated with the user. Secondly, the health score, along with other metrics associated with the user's health, may be used to determine what training tools the user may need to improve the user's respiratory health. Trainings may help the user improve on the biometrics that helped handheld respiratory device 100 determine the health score in the first place. Thirdly, if a user is diagnosed with a certain condition, either by handheld respiratory device 100 or by a doctor or elsewhere, handheld respiratory device 100 may apply therapeutic tools to the user to help the user recover.

To apply the diagnostic tools on the user, the handheld respiratory device 100 may prompt the user to perform a certain number of breaths over a certain amount of time, either on a specific schedule or otherwise, to collect data associated with the user's respiratory health. For example, handheld respiratory device 100 may prompt the user (e.g., via a GUI on handheld respiratory device 100 or on a separate device, such as an application on the user's smartphone) specifically when to start breathing and how many times to breathe over a period of time, and then repeat that process throughout the diagnostic process. As shown in table 1000 of FIG. 10, data may be collected at each specific day and time of the diagnostic process, and biometrics (e.g., temperature, SPO2, heart rate, peak flow, vital capacity, pCO2, etc.) may be calculated based on that data. Table 1000 may be stored and presented to the user via a GUI, or may just be stored in a storage device. Table 1000 (and the raw data, or any other collected data) may be stored in a storage device on handheld respiratory device 100 or stored on an external server or network, such as a cloud network. The diagnostic process assigned to a user may yield biometric results, or a resulting health score, that is used as a baseline health analysis moving forward, such as to assign initial trainings or therapies to the user. However, this baseline may be dynamic and change over time as more diagnostics, trainings, and/or therapies are completed by the user and the user's respiratory health improves (or declines).

As shown by grey shading in table 1000, certain biometrics may be identified by handheld respiratory device 100 as high risk, such as dropping of weight, elevated temperature, lowered blood oxygen levels, elevated heart rate, etc. Handheld respiratory device 100 may make a determination, based on the high risk biometrics and other data, that the user has a specific condition, that the user may have one or more specific conditions, or generally that the user may have an unidentified condition for which the user should seek further guidance from a medical professional. For example, certain data or biometrics may not indicate a high risk condition by itself or themselves, but when combined with other biometrics, the group of biometrics may indicate a high risk condition or respiratory (or other) health concern. If a high-risk condition or situation is discovered, handheld respiratory device 100 may output a notification to the user at a GUI, LED, or other notification device.

When observing the user data over time, handheld respiratory device 100 can identify patterns of health, or instances of respiratory (or other) health conditions. For example, user Joe G appears to be healthy, based on the data collected, through at least four readings since none of the biometrics are outside of normal range during those readings. At reading five, Joe G has a temperature of 99.1, which is a bit above normal range. However, only one biometric out of range may not indicate a high risk health issue. When the temperature continues to rise above 100 at reading six, while temperature is still the only biometric out of range, that biometric is showing a pattern of increasing further and further out of normal range. By reading eight, three biometrics are out of range and when combined may indicate a high risk condition. However, it is difficult to determine when a user is at a high respiratory health risk when several different biometrics are being analyzed. For example, it may be difficult to compare multiple biometrics to one or more thresholds to determine when a user crosses a threshold into being at high risk, especially when certain biometrics may be more important than others, either in general or for the specific user at issue. In other embodiments, a single biometric may indicate a high risk condition, and therefore that biometric may be weighted higher, especially for a health score or other determination associated with that specific condition. For example, COVID-19 may cause acute or silent hypoxia, and a user that has low oxygen saturation numbers may be at high risk for hypoxia. Therefore, handheld respiratory device 100 may determine that the user has this condition, even if only based on one biometric, depending on the level of the biometric indicator. For example, this type of level may be analyzed using the difference between the biometric numbers and the user's baseline, or between the biometric numbers and a more general (applied to all or many users) baseline or "normal" range for that biometric.

FIG. 11 illustrates a chart 1100 that includes example hypothetical data, including risk scores and confidence scores, calculated using collected data from sensors at handheld respiratory device 100, according to embodiments of the present technology. Handheld respiratory device 100 may collect various types of data associated with a user when the user breaths into and out of handheld respiratory device 100, and biometrics determined from that data may assist handheld respiratory device 100, or an external device or network, in generating a health score for a user associated with that device. For example, temperature, SPO2, heart rate, peak flow, vital capacity, pCO2, and others, or a subset of those biometrics, may be combined using an algorithm to determine a single number that represents a health score for the user. This health score may be a simpler way for the user or for a health professional to assess the user's respiratory health than having to work with several different biometrics at once.

Chart 1100 includes twenty different users of handheld respiratory device 100 and their respective data, including health score and confidence score. To determine a user's health score, two or more biometrics may be combined using an algorithm. The algorithm may be constant across users, or the algorithm may be tweaked for each user. For example, if a user indicates to handheld respiratory device 100 that the user puts a high emphasis on achieving a high heart rate because the user wants to achieve difficult aerobic milestones, then the algorithm may be tweaked to put extra emphasis or weighting on heart rate. A similar process may be used for other biometrics.

A health score may also be specific to a certain condition, such as COVID-19. For example, certain biometrics may be more or less relevant to determining a certain condition based on the characteristics and/or symptoms associated with that condition. Therefore, specific weights may be applied to different biometrics so that a health score is tailored to indicate whether a user has a certain condition. More than one health score may be generated and presented to a user, such as a general health score, condition-specific health scores, and specifically tailored health scores as defined by the user. For example, a specific algorithm to determine a general health score and health scores associated with specific conditions may be consistent across users, but user-specific health scores may be private for the user. All health scores and different representations of the data collected, biometrics, and health scores may be presented to the user on a GUI associated with handheld respiratory device 100 or on an external device, such as a smartphone or smartwatch.

Biometrics and health scores may also utilize data collected outside of handheld respiratory device 100. For example, if a user uses a smartwatch that collects data, either some biometrics that overlap with handheld respiratory device 100 or other biometrics, handheld respiratory device 100 may utilize that data to combine with data collected by handheld respiratory device 100 to determine a user's health score. Handheld respiratory device 100 may also only selectively use certain data based on its reliability. For example, handheld respiratory device 100 may assign a device score to certain types of devices based on its knowledge (or outside analysis, such as reviews) of a device's accuracy, and place a weight on external data that is received from external sources based on its reliability.

Chart 1100 also includes a confidence score assigned to each user, or more specifically to each health score, which has been assigned to each user. A confidence score may be determined for a health score based on various factors, including the parameters set by the user for the health score (e.g., how much of a change from the general health score algorithm is the algorithm tailored to a certain user-specific health score as prepared by the user), the external data used as part of the health score determination, the number of diagnostic readings the user participated in, etc. For example, if a user begins to use handheld respiratory device 100 by beginning a diagnostic process, such as the one illustrated in table 1000 in FIG. 10, but the user has only completed a small number of the readings associated with the process, then the confidence score assigned to the resulting health score may be low. In some embodiments, the changes in the confidence sore may track proportionally with the user's progress in the user's diagnostic process, or with the user's process with a specific training or a certain number of trainings. As the user continues to complete readings that are assigned as part of the diagnostic process, then the confidence score may increase.

Both health score algorithms and confidence score algorithms may be dynamic and change over time. For example, as handheld respiratory device 100 collects new data as the user continues to use handheld respiratory device 100, the algorithms (along with the health scores and confidence scores themselves) may be updated and tweaked. For example, handheld respiratory device 100 may determine a health score for a particular person based on the user's collected data from handheld respiratory device 100, and may increase the user's health score over time as the user completes more diagnostics, trainings, and/or therapies. However, the user's respiratory health may improve quicker than the device expected, and the device may tweak the health and/or confidence score algorithm to make up for lagging behind the user's reality.

Chart 1100 also includes a training (e.g., training template) assigned to each user. Handheld respiratory device 100 may generate one or more trainings to offer to users based on their biometrics, health scores, health conditions, or other factors. Each training may be specifically tailored to a user, such as based on the user's general or respiratory health profile, or may be more generally tailored for a certain specific set of biometrics or biometric ranges. Therefore, after a user performs part or all of a diagnostic process, handheld respiratory device 100 may assign a training to the user to improve certain aspects of the user's respiratory health. Trainings may be changed or new trainings may be assigned to a user as the user completes certain trainings, or if the user's respiratory health (or biometrics) change over time for any reason. In other words, handheld respiratory device 100 may dynamically change trainings for a certain user over time based on receiving updated data associated with the user, either from readings from handheld respiratory device 100 or from external sources.

Trainings may have a variety of parameters and/or variables that adjust the training or tailor it to a specific user. Those parameters may include biometrics described herein, such as lung volume, peak expiratory flow, vital lung capacity, oxygenation, heart rate, heart rate variability, etc. Other variables within a training may include the pressure applied to a user's breath, length of breath, number of breaths, volume of air, respiratory targets for each breath, etc.

FIG. 12 illustrates a chart 1200 that includes an example training assigned to a user, according to embodiments of the present technology. Chart 1200 includes a specific regimen that the user can follow, either manually or using prompts from handheld respiratory device 100 (or from a smartphone or other external device that provides the user notifications associated with the user's training). Chart 1200 includes specific steps throughout the training, the day and time at which the user is supposed to perform the step, and specific parameters associated with each step. The specific parameters in chart 1200 include the number of breaths the user should take at each step, the amount of pressure that handheld respiratory device 100 will apply to the user during the breaths at each step, and the amount of rest the user should take after each step. However, a training may have more or fewer parameters, and the parameters may be more or less specific than those in chart 1200. Specifically, the parameters may have sub-parameters that assign even more specific requirements to the user while performing a portion of a training assigned to the user.

After a user begins using handheld respiratory device 100, handheld respiratory device 100 may assign a training to the user based on the user's biometric data. The training may be a predetermined training that was previously generated, or the training may be specifically developed and tailored to that user based on the user's diagnostics. After the user continues to perform more diagnostic steps, or completes portions of or all of one or more trainings assigned by handheld respiratory device 100, handheld respiratory device 100 may then update the training assigned to the user. Handheld respiratory device 100 may adjust the training already assigned to the user (whether a previously predetermined training or a training specifically developed for the user) so that the training is dynamically updated over time based on changes in the user's biometric data.

A training may also update based on the user's interaction with handheld respiratory device 100, or more specifically with the user's accuracy with following the training. For example, if a user skips a step, or performs a step in the wrong day or at the wrong time as compared to the assigned step (e.g. as shown in table 1200 for training 15C), the training may adjust in real-time to make up for the user's actions. For example, handheld respiratory device 100 may add an extra step to the assigned training, or may tweak individual steps (e.g., number of breaths, amount of pressure, amount of rest for the user after a step, the timing of a step, etc.) to make up for the user's actions.

When a user begins using handheld respiratory device 100 and sets up the device, the user may be prompted to take a survey of questions via the handheld respiratory device 100 or via an application on a connected mobile/user device to determine the user's goals and existing conditions. This collected data may allow the handheld respiratory device 100 to set a baseline for training programs, including variable factors such as frequency, duration, intensity, etc. As the user begins using the handheld respiratory device 100 over time, biometric data will be collected, stored, and analyzed to ensure a user's profile matches the baseline. If the data profile does not match the baseline, the user will be alerted and will have the option to modify their training program. Alternatively, the training program may be automatically updated based on newly collected data. The handheld respiratory device 100 will track training sessions and may maintain a calendar function to encourage the user to stay on track with the program. Push notifications via the mobile application may be sent to affirm positive behaviors (e.g., the user is on track with their program) or to encourage users who miss training sessions. If a user misses training sessions, their baseline may be altered to document frequency changes in their training while at the same time providing positive encouragement in order to drive behavioral changes.

Figure 13:
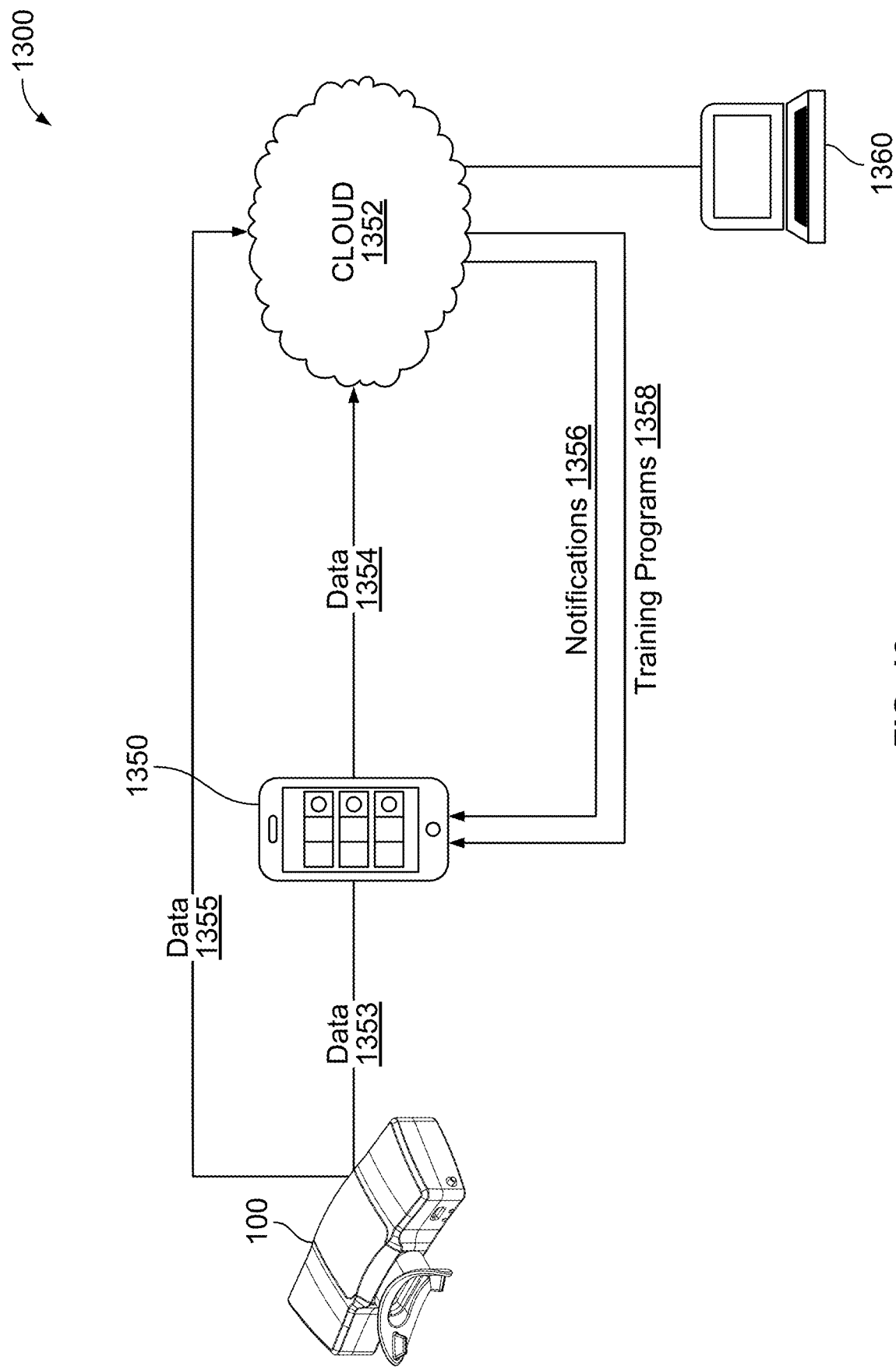
FIG. 13 illustrates a flow diagram including the flow of data, notifications, and other features associated with a handheld respiratory device and its associated devices, according to embodiments of the present technology.

FIG. 13 illustrates a flow diagram 1300 including the flow of data, notifications, and other features associated with handheld respiratory device 100 and its associated devices, according to embodiments of the present technology. Handheld respiratory device 100 may collect data, and may determine biometrics based on that collected data. However, handheld respiratory device 100 may also transmit data 1353 it collects at its sensors to a smartphone 1350 or other similar device (such as data 1354 to cloud 1352 via device 1350), where the user may view the data, make changes to the data, or perform other features associated with the data. Furthermore, handheld respiratory device 100 may also transmit data 1355 to cloud 1352. Either device 1350 or cloud 1352 may perform one or more of the operations disclosed herein as being performed by handheld respiratory device 100, and vice versa. For example, data collected by sensors at handheld respiratory device 100 may be continuously transmitted to device 1350 and/or cloud 1352 so that device 1350 and/or cloud 1352 may, for example, determine a health score for the user. That data, biometrics, time series data, representations of the data provided to the user, health scores, and other information may also be stored at device 1350 or cloud 1352, either to make up for a lack of storage space on handheld respiratory device 100, for backup, or for other reasons. Device 1350 or cloud 1352 may also use data to develop trainings for users, or generally for handheld respiratory device 100, and transmit those trainings back to handheld respiratory device 100. Cloud 1352 may transmit trainings or other data to handheld respiratory device 100 via device 1350, or transmit directly back to handheld respiratory device 100.

Handheld respiratory device 100 may provide notifications to the user about the user's diagnostic process, the user's training, the user's progress, changes to a training, or anything else that may be relevant to the user's use of handheld respiratory device 100. Notifications may be generated at handheld respiratory device 100. Alternatively, notifications 1356 may be generated at cloud 1352 and transmitted back to device 1350 or directly back to handheld respiratory device 100 to be displayed on a GUI associated with handheld respiratory device 100, either integrated or external. A user may view data, trainings, notifications, etc.

on an application associated with handheld respiratory device 100 on device 1350, on such an application on computer 1360, or on a web browser on computer 1360.

Either a GUI or a device 1350 that is electronically connected to handheld respiratory device 100 (e.g., via Bluetooth, WiFi, 4G, or other protocol) may be used to interact with the user, either to receive information from the user or otherwise. For example, the diagnostic process that the user participates in may include one or more questions as part of a questionnaire to determine self-attributed health parameters associated with the user. The questions may be the same for each user, or may be specifically tailored to the user based on data already collected about the user (e.g., age, sex, weight, sensor data, biometric data, etc.).

Handheld respiratory device 100 may be fully integrated with a cloud IoT Platform, and may use satellite services for geo-tagging (SatNav services, such as Galileo GPS) and have fully integrated data communications (e.g., StatCom) with potential for enrichment using earth observation data, supporting timely diagnostic tracking and offsite therapeutic training.

In some embodiments, handheld respiratory device 100 may be in a scenario where it does not have (or loses) access to a mobile device 1350, a cloud 1352, or another external device that allows for external processing, user viewing, etc. The handheld respiratory device 100 may have enough on-board memory to store the results of a user's training sessions to be uploaded to a mobile device 1350 or cloud 1352 upon re-connection.

Figure 14:
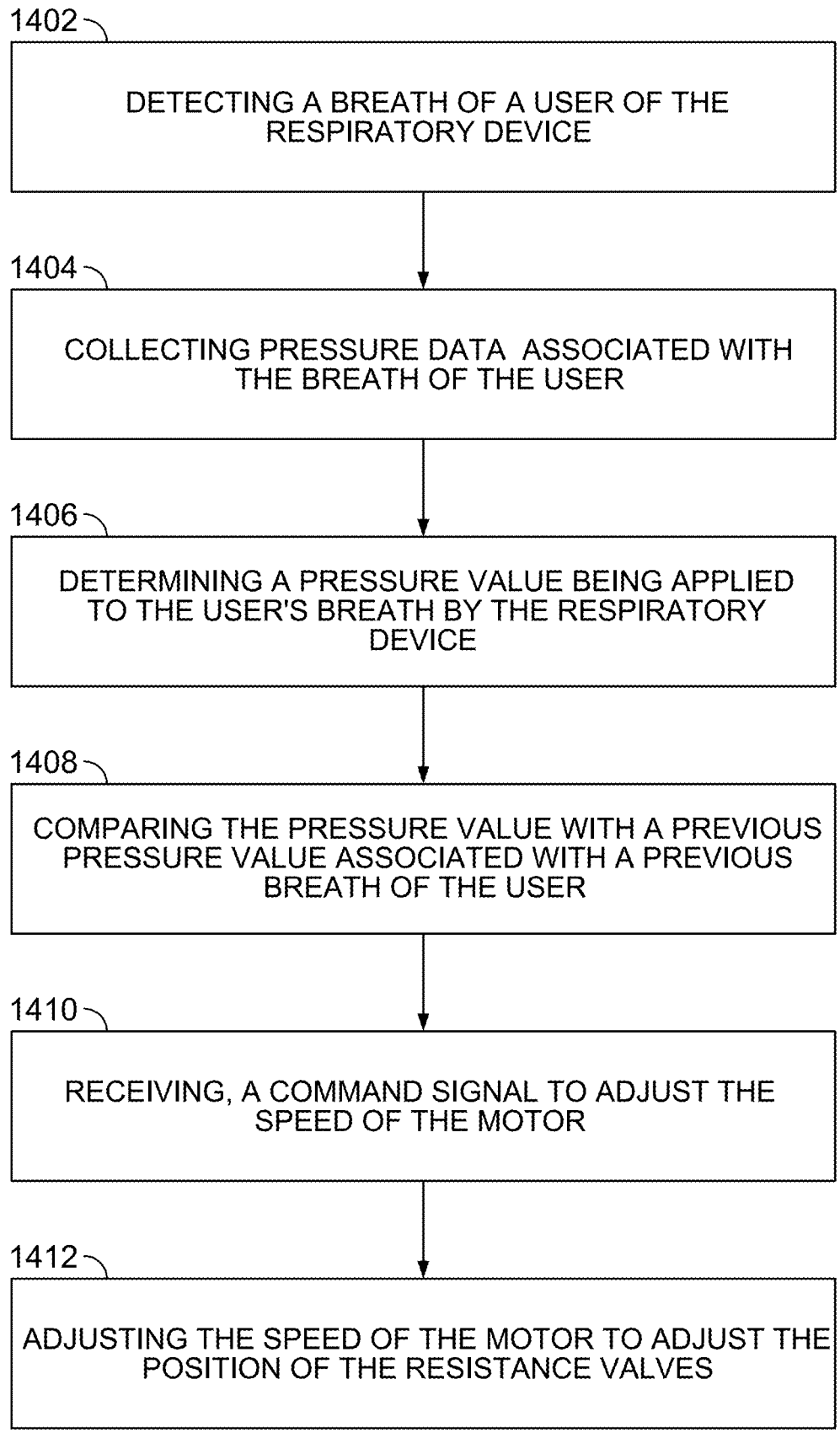
FIGS. 14-16 illustrate example processes according to embodiments of the present technology.

FIG. 14 illustrates a process according to embodiments of the present technology. Step 1402 includes detecting a breath of a user of the respiratory device. Detecting the breath may be performed at a differential pressure sensor integrated into a respiratory device. Step 1404 includes collecting pressure data associated with the breath of the user. Step 1406 includes determining a pressure value being applied to the user's breath by the respiratory device. The determining may be performed by a processor integrated into the respiratory device. Step 1408 includes comparing (e.g., by the processor) the pressure value with a previous pressure value associated with a previous breath of the user. Step 1410 includes receiving, at a motor, a command signal to adjust the speed of the motor. The motor may be integrated into the respiratory device. The command signal may be received from the processor. Step 1412 includes adjusting the speed of the motor. Adjusting the speed of the motor may cause a change in one or more resistance valves integrated into the respiratory device. The position of the resistance valves may determine an amount of pressure to be applied to the breath of the user during the user's next breath.

Figure 15:
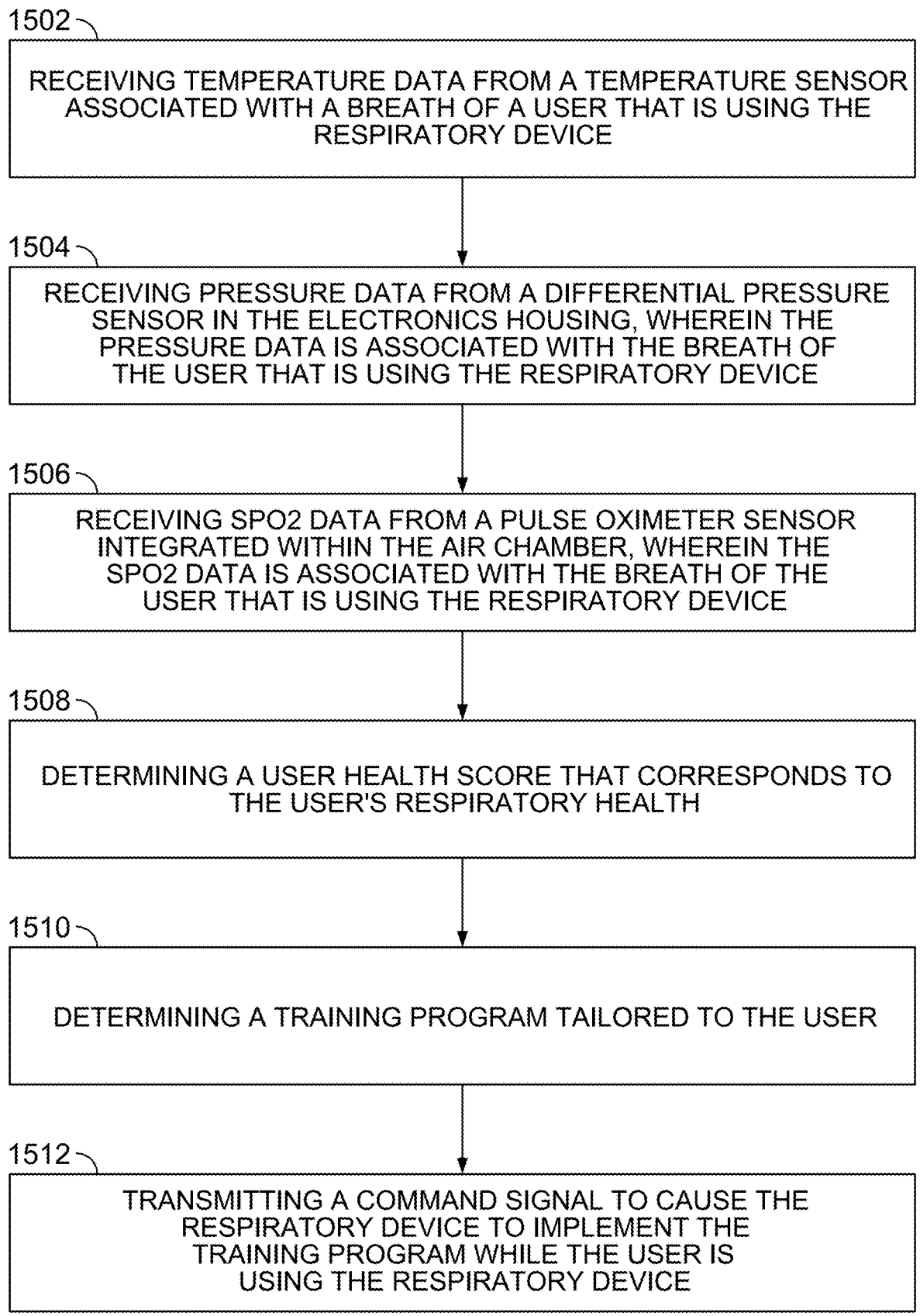

FIG. 15 illustrates a process according to embodiments of the present technology. Step 1502 includes receiving temperature data from a temperature sensor and wherein the temperature data is associated with a breath of a user that is using the respiratory device. The temperature sensor may be integrated within an air chamber of the respiratory device. Step 1504 includes receiving pressure data from a differential pressure sensor, wherein the pressure data is associated with the breath of the user that is using the respiratory device. The differential pressure sensor may be located in an electronics housing of the respiratory device. Step 1506 includes receiving SPO2 data from a pulse oximeter sensor, and wherein the SPO2 data is associated with the breath of the user that is using the respiratory device. The pulse oximeter sensor may be integrated within an air chamber of the respiratory device. Step 1508 includes determining a user health score that corresponds to the user's respiratory health. The health score may be determined using the temperature data, pressure data, and SPO2 data. Step 1510 includes determining a training program tailored to the user. The training program may be configured to improve the user's respiratory health. The training program may be determined using the user health score. Step 1512 includes transmitting a command signal to cause the respiratory device to implement the training program while the user is using the respiratory device.

Figure 16:
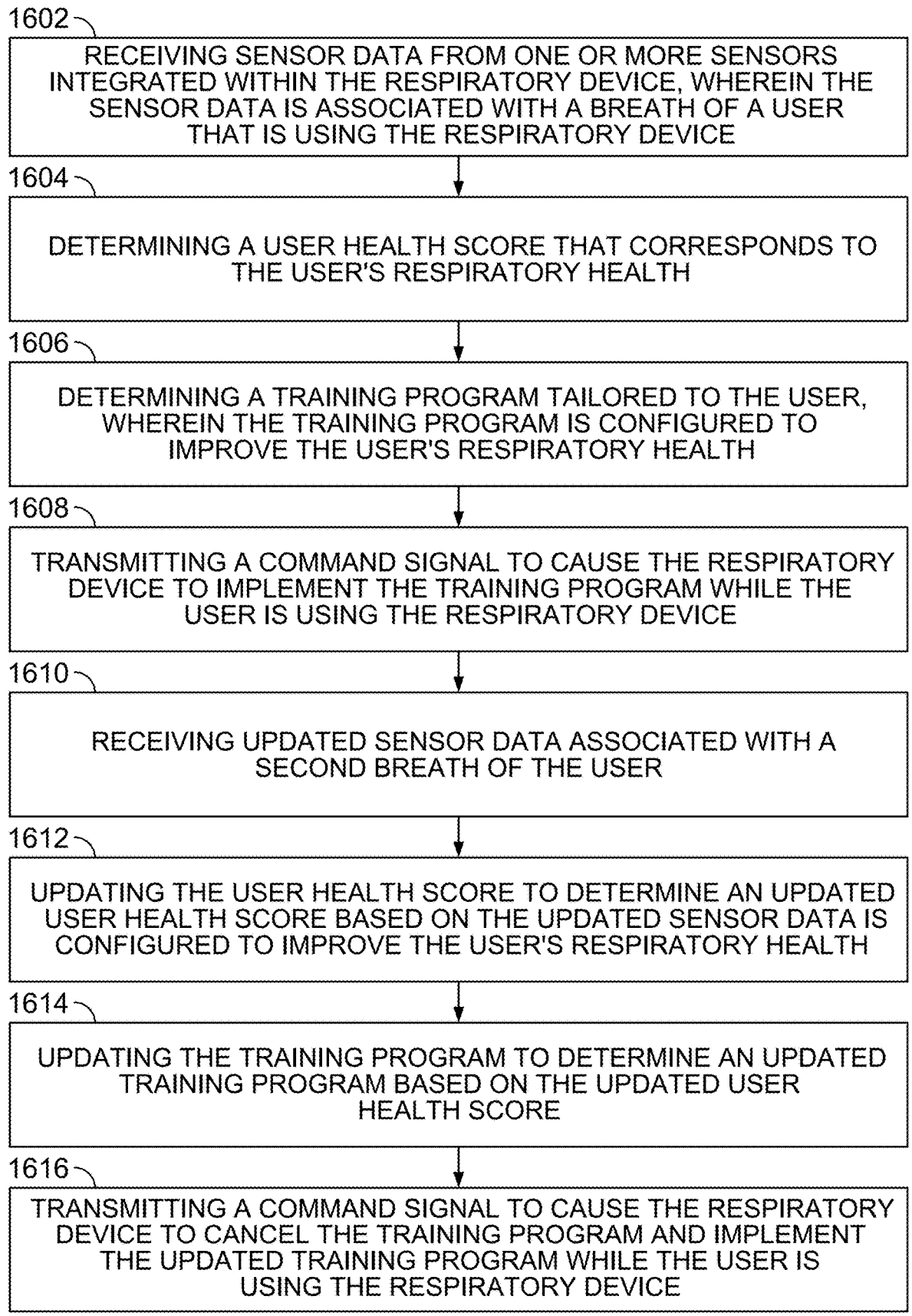

FIG. 16 illustrates a process according to embodiments of the present technology. Step 1602 includes receiving sensor data from one or more sensors integrated within a respiratory device. The sensor data may be associated with a breath of a user that is using the respiratory device. The sensor data may be received at a processor in an electronics housing of the respiratory device. Step 1604 includes determining a user health score that corresponds to the user's respiratory health. The user health score may be determined using the sensor data. Step 1606 includes determining a training program tailored to the user. The training program may be configured to improve the user's respiratory health. The training program may be determined using the user health score. Step 1608 includes transmitting a command signal to cause the respiratory device to implement the training program while the user is using the respiratory device. Step 1610 includes receiving updated sensor data associated with a second breath of the user. Step 1612 includes updating the user health score to determine an updated user health score based on the updated sensor data. Step 1614 includes updating the training program to determine an updated training program. Updating the training may be based on the updated user health score. Step 1616 includes transmitting a command signal to cause the respiratory device to cancel the training program and implement the updated training program while the user is using the respiratory device.

Figure 17:
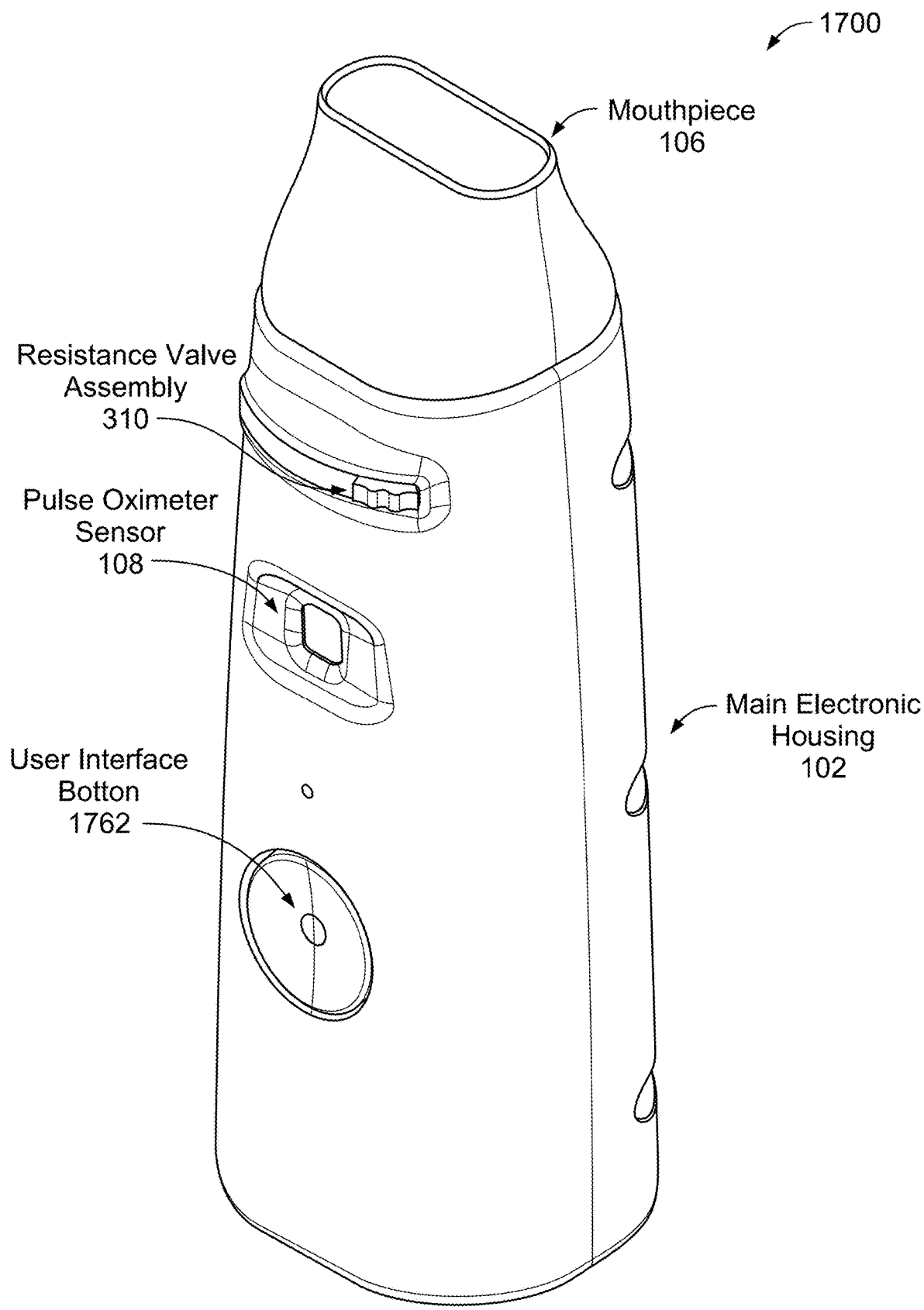
FIG. 17 illustrates a handheld respiratory device, according to embodiments of the present technology.

FIG. 17 illustrates a handheld respiratory device 1700, according to embodiments of the present technology. Handheld respiratory device 1700 may include, for example, a main electronics housing 102, a mouthpiece 106, resistance valve assembly 310, a pulse oximeter sensor 108, and a user interface button 1762, although handheld respiratory device 1700 may include other or fewer components as well. Main electronics housing 102 may include a variety of electronics that assist handheld respiratory device 1700 to perform its functions, as described herein. Handheld respiratory device 1700 may include any of the hardware (e.g., sensors) or functionality that handheld respiratory device 100 described herein includes. Some of the differences between handheld respiratory device 1700 and handheld respiratory device 100 are described below and otherwise herein. However, a person of ordinary skill in the art would understand that these embodiments and components/functionalities therein may be interchangeable.

Figure 18:
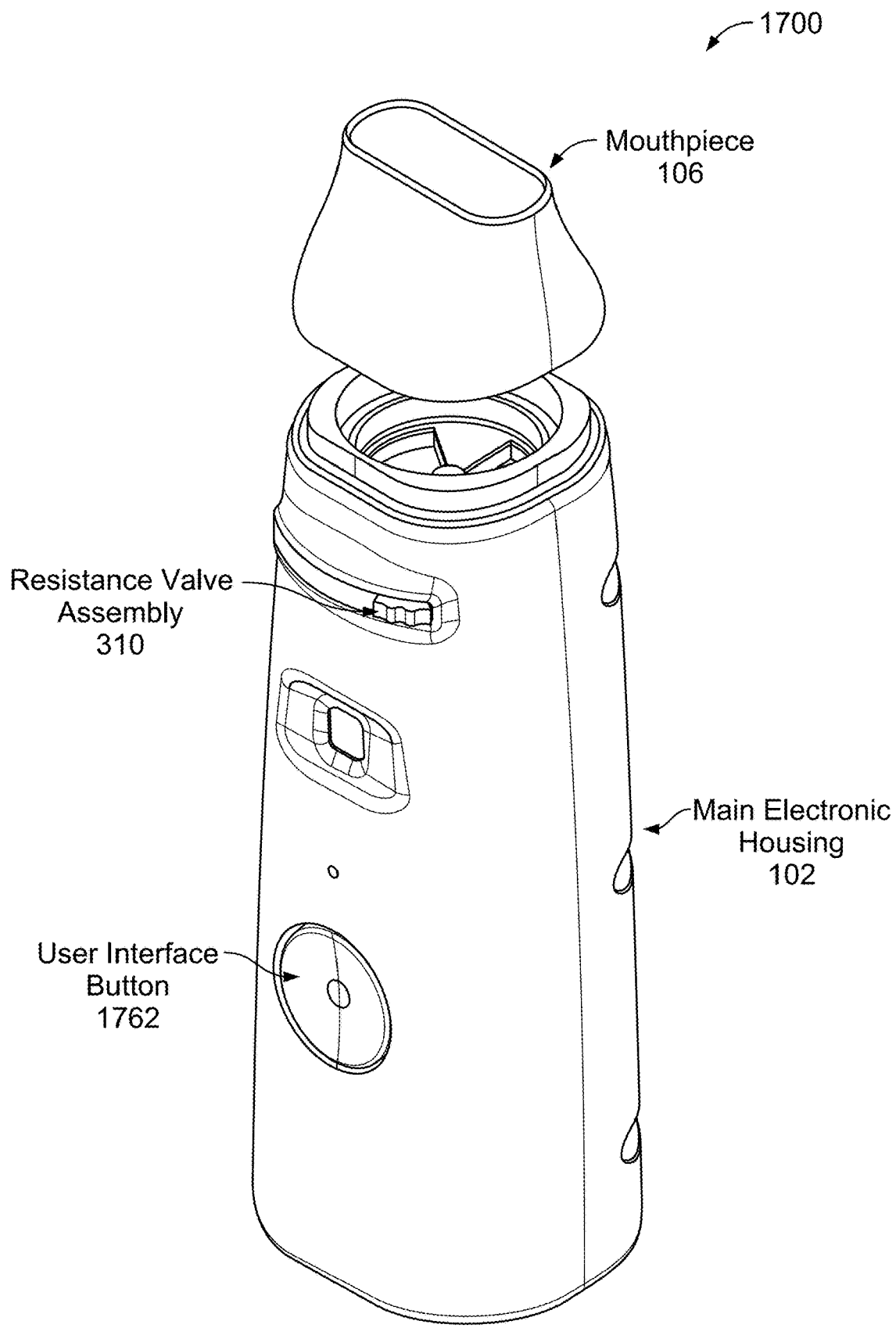
FIG. 18 illustrates mouthpiece of the handheld respiratory device removed from the main electronics housing, according to embodiments of the present technology.
Figure 19:
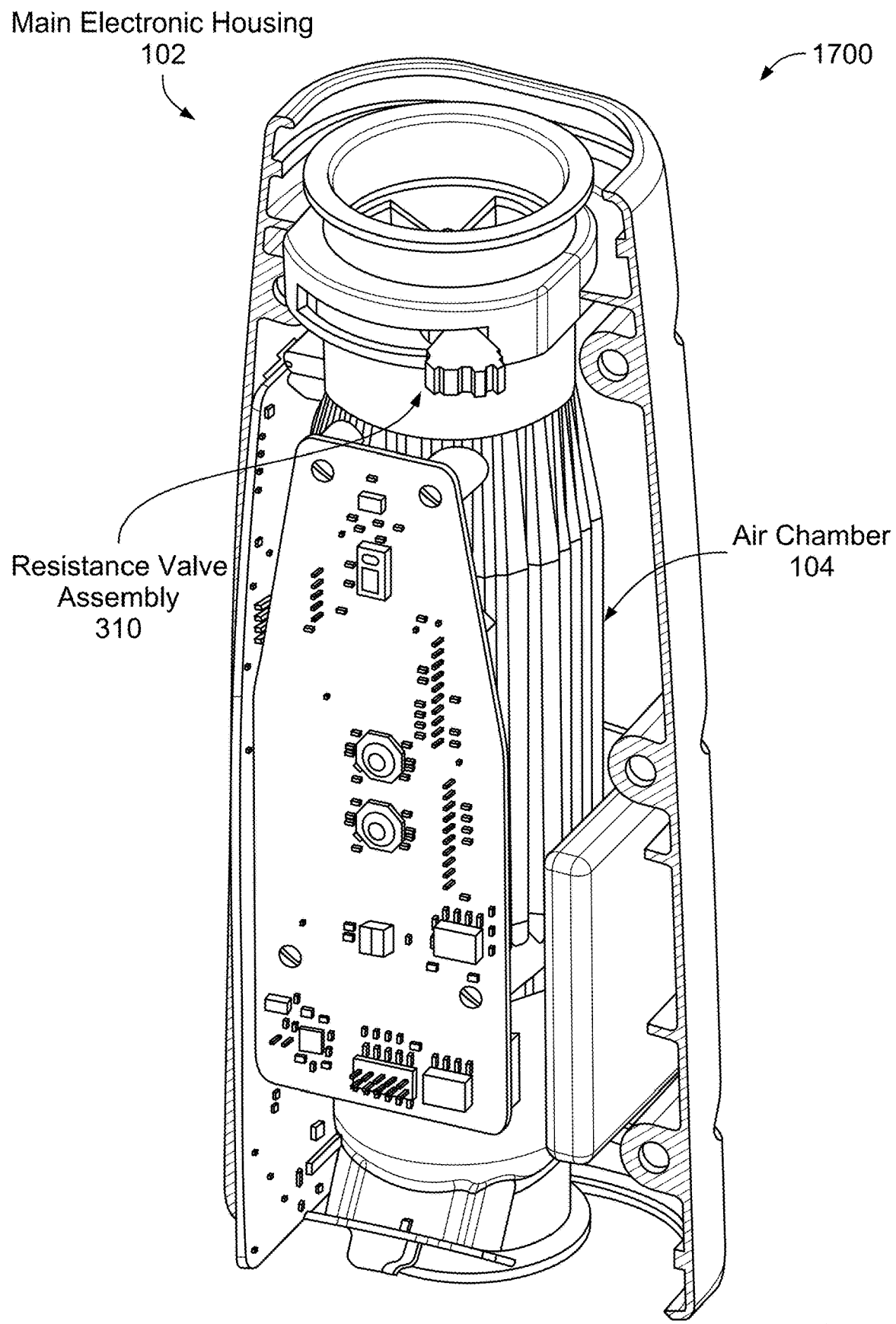
FIG. 19 illustrates a cross-sectional view of the main electronics housing including the resistance valve assembly and air chamber, according to embodiments of the present technology.

Unlike handheld respiratory device 100, handheld respiratory device 1700 does not include a removable air chamber 104. As will be discussed further herein, handheld respiratory device 1700 may include an air chamber that may connect to mouthpiece 106 and/or main electronics housing 102 as shown, for example, in FIG. 1, but air chamber 104 may be fixed as a part of the main electronics housing 102 and not removable along with mouthpiece 106. However, as shown in FIG. 18, mouthpiece 106 may be removable from main electronics housing 106. A user may place their mouth on/over mouthpiece 106 and breath into mouthpiece 106 so that their breath travels into mouthpiece 106 and then into an air chamber within the main electronics housing 102, as shown in FIG. 19.

Figure 21:
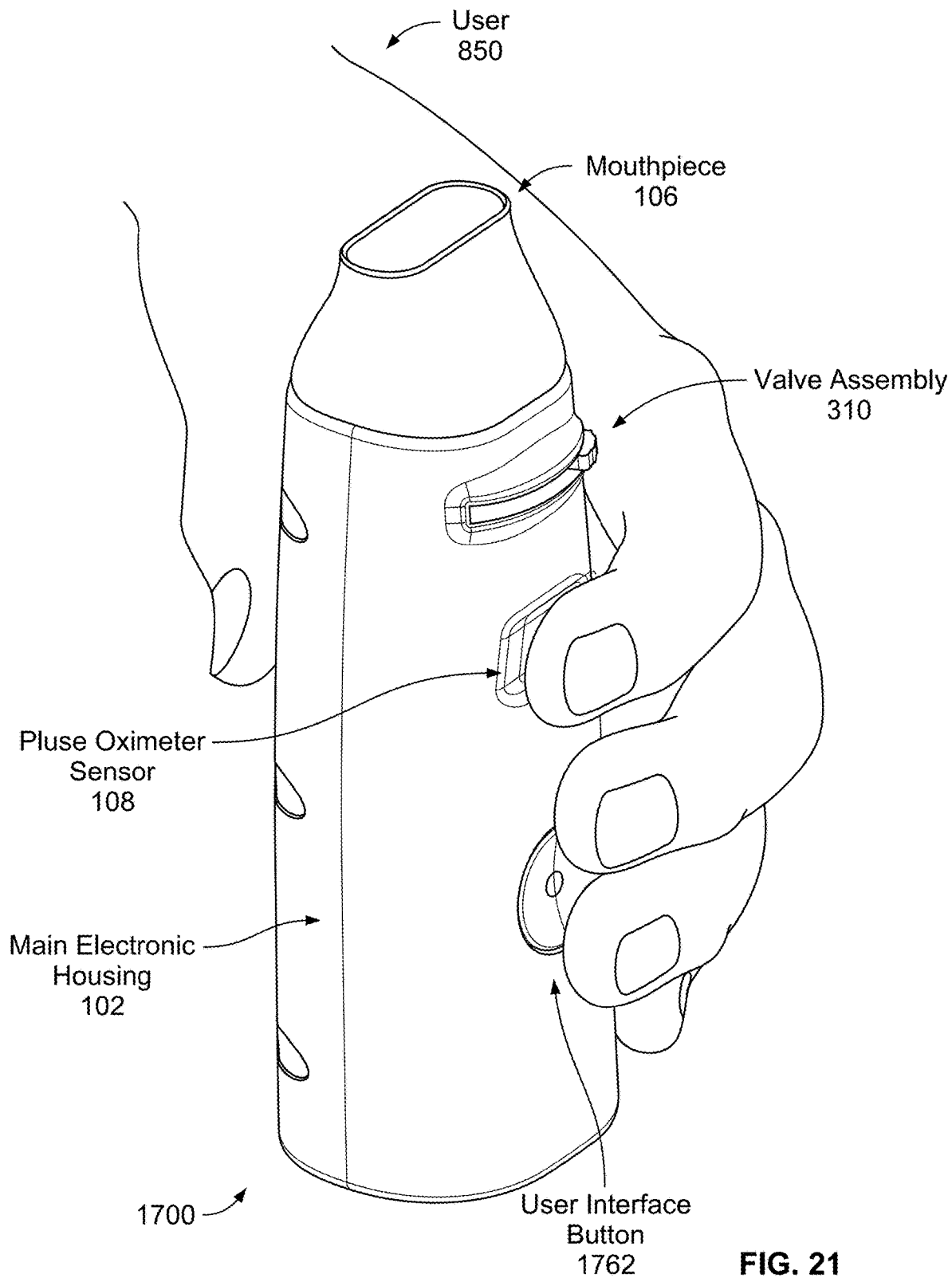
FIG. 21 illustrates a user using a handheld respiratory device, according to embodiments of the present technology.

Handheld respiratory device 1700 includes a pulse oximeter sensor 108. Pulse oximeter sensor 108 may be positioned adjacent or close to mouthpiece 106, or may be a part of mouthpiece 106, but may also be positioned within main electronics housing 102 at a distance away from mouthpiece 106. For example, as shown in FIG. 21, pulse oximeter sensor 108 may be positioned to touch a finger of a user of handheld respiratory device 1700 when the user is holding the handheld respiratory device 1700. Pulse oximeter sensor 108 may collect data from the user's finger, including, for example, pulse rate and oxygen saturation levels of the user. The inventors determined that handheld respiratory device 1700 may allow the pulse oximeter sensor 108 to achieve optimal or substantially optimal accuracy when collecting data and computing pulse oximetry and oxygen saturation levels for the user.

When a user inhales at mouthpiece 106, air is pulled through resistance valves 310 and into an air chamber of main electronics housing 102. The resistance felt by a user inhaling or exhaling at mouthpiece 106 is dependent upon how much pressure is applied to their breath by handheld respiratory device 1700. The amount of pressure applied to a user's breath is determined by how free the air flow is between outside the device to inside the device as it passes through resistance valves 310. Therefore, the amount of pressure on a user's breath may be changed by opening and closing resistance valves 310, as described herein.

User interface button 1762 may allow a user of handheld respiratory device 1700 to control the functionality of handheld respiratory device 1700. User interface button 1762 may also allow a user of handheld respiratory device 1700 to control a GUI (not shown) that is a part of or electronically connected to handheld respiratory device 1700. The GUI may also be a part of a separate device, such as a smartphone, tablet, smartwatch, or others. Alternatively, data collected at the handheld respiratory device 1700 may be transmitted to a user at a user device (e.g., smart phone, smart watch, tablet, computer, etc.).

Furthermore, the user interface button 1762 may allow the user to perform various functions during a training session without needing to directly interface with, for example, a mobile application on a user/mobile device. For example, a long hold of the button may pause the training session. The mobile application UI may give the user the option to continue or quit a training. For example, a quick button press may continue the training, while another long button press may quit the training program. This pause may be shown within the GUI of the mobile application. In another example, two short clicks could increase the intensity of the training program. In another example, three short clicks could decrease the intensity of the program. Any of these functionalities may be configured or changed by the user to perform other functions as designated by the user. The user interface button 1762 may allow the user to control the handheld respiratory device 100 and its trainings if, for example, the handheld respiratory device 100 is not connected to the internet, external devices, etc.

FIG. 18 illustrates mouthpiece 106 of the handheld respiratory device 1700 removed from the main electronics housing 102, according to embodiments of the present technology. As noted, mouthpiece 106 is removable from main electronics housing 102, as shown in FIG. 18. Unlike in FIG. 2, air chambers to receive air breathed into handheld respiratory device 1700 are located within main electronics housing 102, and is not removable from main electronics housing 102. However, handheld respiratory device 1700 may include an air chamber that is removable along with mouthpiece 106, although not shown in FIG. 18. Mouthpiece 106 may be removed from electronics housing 102 so that a user may wash air mouthpiece 106 after use by one user and before use by a different user so as to prevent the spread of germs between users. Even though mouthpiece 106 of the handheld respiratory device 1700 is removable from the main electronics housing 102, when mouthpiece 106 is connected to electronics housing 102, components from mouthpiece 106 and electronics housing 102 may contact or otherwise connect to each other such that the two components may pass air, data, or other items back and forth between each other.

Mouthpiece 106 may be comprised of molded soft plastic that is configured to removably attach to main electronics housing 102. In some embodiments, such as shown in FIG. 18, mouthpiece 106 does not include any sensors attached to it or integrated within it. However, in other embodiments, a sensor, such as the SPO2 sensor, may be connected to or integrated within mouthpiece 106.

FIG. 19 illustrates a cross-sectional view of the main electronics housing 102 including the resistance valve assembly 310 and air chamber 104, according to embodiments of the present technology. Main electronics housing 102 may include a variety of electronics that assist handheld respiratory device 1700 to perform its functions, as described herein. As shown in FIG. 19, the main electronics housing 102 also includes a resistance valve assembly 310 and an air chamber 104. When a user breathes into a mouthpiece (e.g., mouthpiece 106, not shown in FIG. 19) connected to main electronics housing 102, air from the user's breath passes through resistance valve assembly 310 and into air chamber 104. Handheld respiratory device 1700 is configured so that a user's breath is captured in air chamber 104 and is available to other components in main electronics housing 102. Air chamber 104 and sensors included within main electronics housing 102 for capturing data associated with the user's breath. For example, components in main electronics housing 102 and air chamber 104 may collect data from the user's breath to determine the user's pulse oximetry, among other data. As described further herein, resistance valves 310 that may open and close to change the amount of pressure being applied to the user's ability to breath when breathing into the handheld respiratory device 1700.

As noted, when a user breathes into handheld respiratory device 1700, air from the user's breath passes through resistance valve assembly 310 before entering into air chamber 104. The opening and closing of resistance valves to change the pressure applied to a user's breath may be stepped up or down in as small or large intervals as necessary to calibrate the pressure. A motor (e.g., stepper motor or servo motor) may drive movement of resistance valve assembly 310 to achieve such calibration.

As noted with respect to handheld respiratory device 100, resistance valves 310 may provide at least two purposes: (1) resistance valves 310 may provide a way to increase and/or decrease air resistance in order to give the user a lung workout by increasing the effort required to breathe through the device; and (2) resistance valves 310 may serve as a pressure drop element for the differential pressure sensor 630. For example, the valves may act as an orifice plate flow meter. However, with respect to handheld respiratory device 1700, the resistance valves 310 has the responsibility of providing an increase and/or decrease in air resistance to give the user a lung workout by increasing the effort required to breathe through the device. However, as noted herein, handheld respiratory device 1700 includes a separate pressure drop element 2270 has been separated into a stand-alone device within the handheld respiratory device 1700. This is beneficial because the position of the resistance valves are removed from the equation/calculation of pressure by pressure sensor 630. Furthermore, the pressure drop element 2270 contains capillary tubes, which provides more accurate flow calculations than when resistance valves are used for the same purpose.

Figure 20:
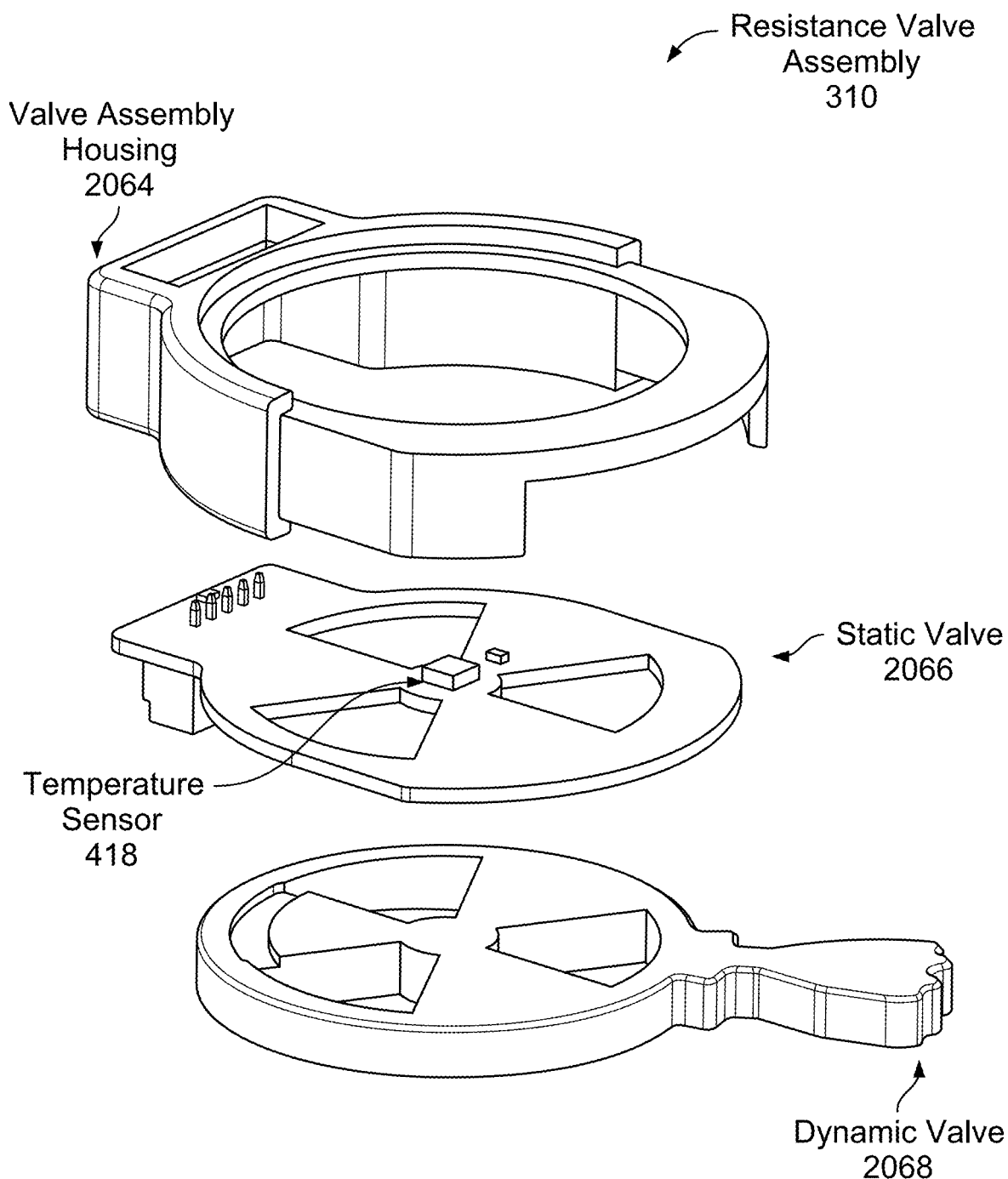
FIG. 20 illustrates an exploded view of resistance valve assembly 310, according to embodiments of the present technology.

FIG. 20 illustrates an exploded view of resistance valve assembly 310, according to embodiments of the present technology. The valve assembly 310 shown in FIG. 20 may be incorporated into any embodiments disclosed herein, including handheld respiratory device 100 or handheld respiratory device 1700. Resistance valve assembly 310 includes valve assembly housing 2064, a static valve 2066, and a dynamic valve 2068. As shown in FIG. 19, for example, resistance valve assembly 310 may be located within the main electronics housing 102 between the air chamber 104 and a mouthpiece (e.g., mouthpiece 106, not shown in FIG. 19). More specifically, valve assembly housing 2064, with static valve 2066 and dynamic valve 2068 held within assembly housing 2064, may be located within handheld respiratory device 1700 in that location. When a user breathes into or out of handheld respiratory device 1700, the resistance felt by the user at the mouthpiece when inhaling or exhaling is dependent upon how much pressure is applied to their breath by handheld respiratory device 1700. The amount of pressure applied to the user's breath is determined by how free the air flow is between outside the device to inside the device as it passes through resistance valves 310. Therefore, to change the amount of pressure on a user's breath can be changed by opening and closing resistance valves 310.

Static valve 2066 and dynamic valve 2068 may both be located within valve assembly housing 2064. Static valve 2066 may be static with respect to valve assembly housing 2064, and therefore with respect to the main electronics housing 102 since valve assembly housing 2064 and static valve 2066 are fixed with respect to main electronics housing 102. However, dynamic valve 2068 may move (e.g., rotate) with respect to static valve 2066 and valve assembly housing 2064 (and therefore main electronics housing 102). When within valve assembly housing 2064, static valve 2066 and dynamic valve 2068 may be positioned so that one face of static valve 2066 is flush or substantially flush with one face of dynamic valve 2068. As shown in FIG. 20, static valve 2066 and dynamic valve 2068 each include three openings. Static valve 2066 and dynamic valve 2068 may each include more or fewer openings than shown in FIG. 20, but in some embodiments would have the same number of openings as each other. The openings in static valve 2066 and dynamic valve 2068 may be the same or substantially the same size and shape so that when the openings of static valve 2066 and dynamic valve 2068 are lined up with each other, they allow for the free flow of air (e.g., user's breath) through the openings. Static valve 2066 and dynamic valve 2068 may also include portions that are solid (i.e., not an opening through the valve) such that when dynamic valve 2068 rotates with respect to static valve 2066, one or more solid portions of static valve 2066 may cover one or more openings of dynamic valve 2068. Similarly, when dynamic valve 2068 rotates with respect to static valve 2066, one or more solid portions of dynamic valve 2068 may cover one or more openings of static valve 2066. When a solid portion of a valve covers an opening of another valve, the openings within static valve 2066 and/or dynamic valve 2068 are smaller than if the openings fully overlapped. Therefore, smaller openings may allow for less air (e.g., user breath) to flow through the valves, and therefore through the resistance valve assembly 310. Resistance valves 310 change the amount of pressure being applied to the user's ability to breath when breathing into the handheld respiratory device 1700. Therefore, to change the amount of pressure being applied to the user's breath, handheld respiratory device 1700 may move dynamic valve 2068 with respect to static valve 2066 to change the amount of the openings within dynamic valve 2068 and static valve 2066 that overlap.

Valve assembly 310 may be manually adjusted by a user (e.g., by moving a manual lever or other component of valve assembly 310) or may be adjusted remotely from a user device, such as a mobile device (e.g., smartphone). For example, valve assembly 310 and its motor may be electronically connected to a processor within electronics housing 102, and the processor may communicate with a user device. The user device may include a GUI that may allow a user, medical professional, or someone else to control functionality within handheld respiratory device 1700, including but not limited to valve assembly 310. Furthermore, valve assembly 310 may be adjusted automatically (by handheld respiratory device 1700 itself), such as during a training program for the user. Handheld respiratory device 1700 may also dynamically adjust in real time based on its calculated or predicted future (e.g., using machine learning) lung capacity or other capabilities. For example, if a user's lung capacity or other capabilities have improved or reduced since the last time the user used the handheld respiratory device 1700, the handheld respiratory device 1700 may adjust on the fly to dynamically allow the user to undergo a training and/or therapeutic program that is in line with the user's capabilities.

Resistance valve assembly 310 may also include a temperature sensor 418. Temperature sensor 418 may record the temperature of the breath of a user at different points in time, as described herein. Collecting temperature data at temperature sensor 418 may allow the device to determine, alone or in combination with other data collected by handheld respiratory device 1700 or otherwise, if the user certain health conditions. Temperature sensor 418 in FIG. 20 may include the same hardware and/or functionality as temperature sensor 418 as described herein, such as with respect to handheld respiratory device 100. However, temperature sensor 418 may be located within resistance valve assembly 310, such as being connected to static valve 2066 (or the housing, or another valve within the valve assembly) instead of elsewhere within air chamber 104 and/or electronics housing 102.

FIG. 21 illustrates a user 850 using handheld respiratory device 1700, according to embodiments of the present technology. User 850 is holding handheld respiratory device 1700 so that the user 850 can breathe into and out of handheld respiratory device 1700. The hand of user 850 is situated so as to connect with the pulse oximeter sensor 108 on handheld respiratory device 1700. As noted herein in other embodiments, pulse oximeter sensor 108 may be located elsewhere on handheld respiratory device 1700 such that it may connect with other parts of the user, such as the user's lip.

As described with respect to handheld respiratory device 100, pulse oximeter sensor 108 captures data from user 850 by using a red LED and/or an infrared LED to reflect light off of tissues of the user's body (in this case, the user's finger, such as the user's index finger. The LEDs may reflect from portions of the finger such as the user's blood and capillaries inside the finger. Pulse oximeter sensor 108 may then capture spikes (e.g. peaks and/or troughs) related to blood flow within the finger. Pulse oximeter sensor 108 may capture this raw data in the form of a reflected spectrum, which is proportional to the amount of oxygen in the blood. For example, spikes in the data spectrum may represent high or low amounts of oxygen because blood with low oxygen may reflect the LEDs less, while blood with more oxygen may reflect the LEDs more, relative to each other. The pulse oximeter sensor 108 may also determine the user's heart rate variability, blood pressure, and other biometrics that may assist handheld respiratory device 100 determine if the user has certain health conditions as described herein. For example, while a healthy user may have an oxygen saturation of over 90%, if the user has an oxygen saturation below 90%, then that biometric may be an indication that the user has a health condition. For example, this indication may be combined with other indications from other biometric data to determine a health score, as described herein.

As described in more detail with respect to FIG. 20, handheld respiratory device 1700 includes a valve assembly 310 that allows for the pressure being applied to the user's breath to change, such as manually by the user, remotely, or automatically. As shown in FIG. 21, valve assembly 310 includes a sliding knob that can be slid in two directions to either increase or decrease the positions of the valves to change the pressure being applied to the user's breath. However, other mechanisms may be used other than such a knob as shown in FIG. 21.

Figure 22:
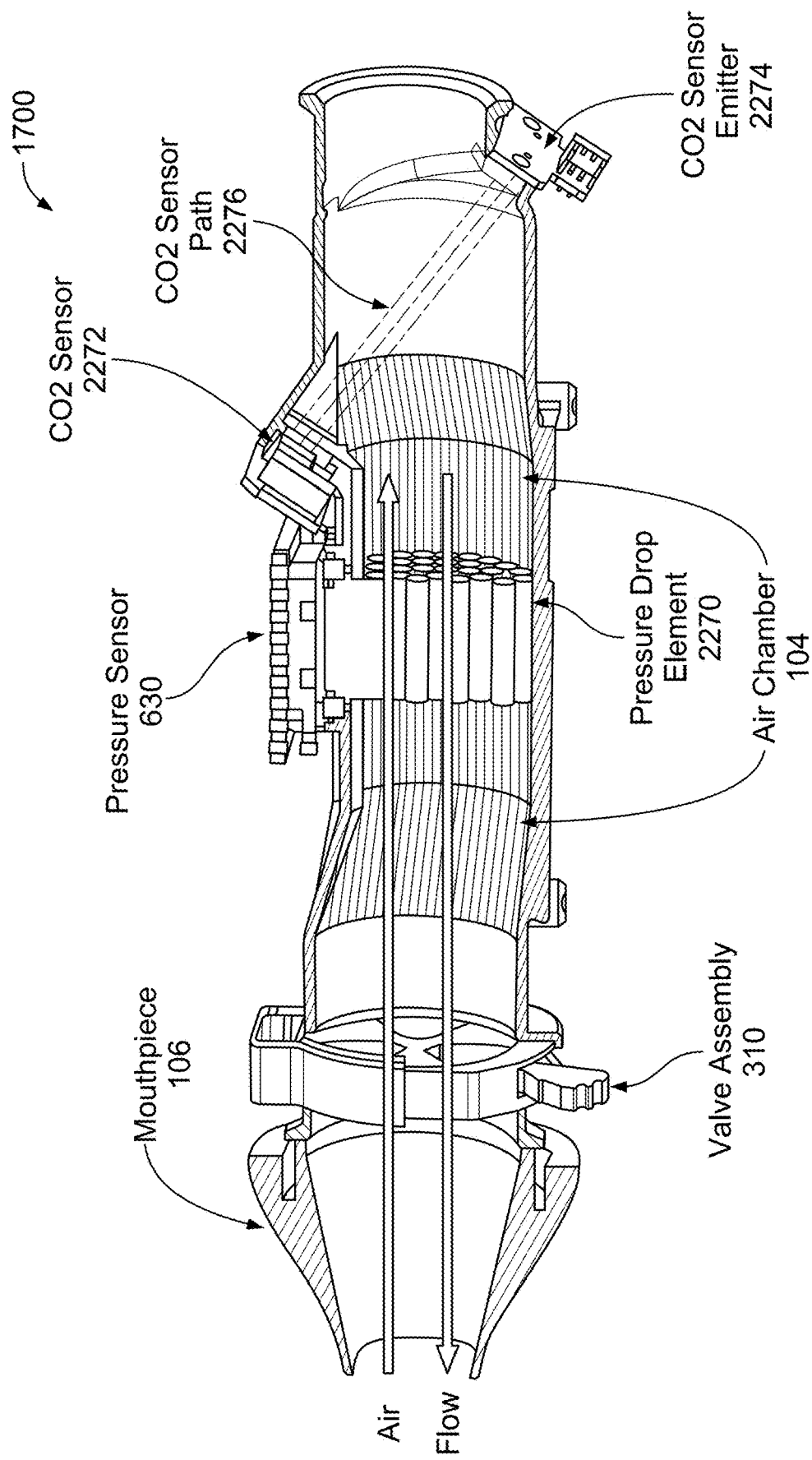
FIG. 22 illustrates a cross-sectional view of a handheld respiratory device, according to embodiments of the present technology.

FIG. 22 illustrates a cross-sectional view of handheld respiratory device 1700, according to embodiments of the present technology. As described herein, handheld respiratory device 1700 includes a mouthpiece 106, valve assembly 310, air chamber 104, pressure sensor 630, and pressure drop element 2270. Pressure sensor 630 may be used for determining certain biometrics of a user to help determine if a user has one or more conditions that can be treated by handheld respiratory device 1700 or otherwise. For example, the pressure sensor 630 may be used to determine peak flow and vital lung capacity of the user. Pressure sensor 630 can collect data from a person's breath so that handheld respiratory device 100 can determine the person's peak flow and vital lung capacity. Pressure sensor 630 of handheld respiratory device 1700 may include similar components and functionality to pressure sensor 630 in handheld respiratory device 100.

For example, pressure sensor 630 may collect data associated with both ambient and user-produced air that are fed past differential pressure sensor 630. Data associated with air from the user's breath, as received from air chamber 104, may be compared to data associated with ambient air, as received from outside of the device, to determine a pressure differential, or the current pressure being applied to the user's breath by handheld respiratory device 1700. However, handheld respiratory device 1700 may, for example, not use reference tubes (e.g., ambient pressure reference tube 626 or air chamber pressure tube 628 as shown in FIG. 6) to bring air to pressure sensor 630 such as in handheld respiratory device 100.

Pressure drop element 2270 helps handheld respiratory device 1700 determine air flow, such as from a user's breath. Pressure drop element 2270 as shown in FIG. 22 is in the shape of a cluster of capillary tubes (e.g., fleisch pneumotachograph), but pressure drop element 2270 may be implemented into handheld respiratory device 1700 in a variety of different shapes, sizes, and patterns. Pressure drop element 2270 may act as a spirometer, or in other words a component that can measure/sense flow within a differential pressure sensor, such as pressure sensor 630.

The air chamber 104 may be a larger tube with a cluster of smaller capillary tubes (pressure drop element 2270) in the center of the larger tube, as shown in FIG. 22. The pressure sensor 630 ports (not shown) are measuring the pressures directly before and after the section of the capillary tubes that make up the pressure drop element 2270. The pressure sensor 630 may collect data associated with, and calculate, the pressure difference between both sides of the capillary section (e.g., a single number that represents the difference). This difference may then be used to calculate pressure associated with the user's breath.

As a user steadily exhales through the handheld respiratory device 1700, the air will get slightly backed up as it is being forced into the pressure drop element 2270. More specifically, air that is headed for a solid portion of pressure drop element 2270 would be forced to shift into one of the openings within pressure drop element 2270, along with any other air moving through the openings. This extra "backup" of air creates a high pressure on that side of the capillary tube system, and the differential pressure sensor 630 can measure this increased pressure. Once the air has successfully entered the capillary section (i.e. the openings within it), the air flows more quickly because the air has progressed past the backup. After the air escapes out of the pressure drop element 2270, the air re-combines into the larger opening/tube of the air chamber 104, which creates a low-pressure zone because the air has more room to expand into. In some embodiments, the section of air chamber 104 that is located directly after (with respect to air flow) the tubes may be slightly lower pressure than ambient due to the speed and expansion of the air. The pressure sensor may measure this lower than ambient pressure, and then compares both the low- and high-pressure measurements, and determines the difference.

The harder a user breathes into the handheld respiratory device 1700, the higher the pressure on the first port, the faster the velocity of air flow through the tubes, and the lower the pressure on the second port. The inventors have determined that this setup consistently provides accurate flow readings.

Handheld respiratory device 1700 also includes a CO2 (carbon dioxide) sensor 2272 and CO2 emitter 2274. CO2 sensor 2272 may be, for example, a nondispersive infrared (NDIR) sensor. Air flows through the valve assembly 310, through pressure drop element 2270, and through a CO2 sensor path 2276, which is generated by an IR beam/fan of light at a range of infrared wavelengths (e.g., black-body radiation) transmitted by a CO2 sensor emitter 2274 to CO2 sensor 2272. CO2 absorbs a specific wavelength of light/infrared (4.26 microns) it comes into contact with. When a user breathes into handheld respiratory device 1700, the CO2 from the user's breath absorbs such light as well. Therefore, the CO2 from the user's breath may absorb infrared from the IR beam transmitted from the CO2 sensor emitter 2274.

CO2 sensor 2272 includes two sensors, each with filters. One sensor at the CO2 sensor 2272 has a filter (e.g., glass filter) so that that sensor detects only the specific wavelength of light captured by the CO2 from the user's breath (i.e., 4.26 microns). The other sensor at the CO2 sensor 2272 has a filter that detects only a specific wavelength (e.g., 3.91 microns, which is not impacted by the CO2 from the user's breath) of light that is different than the one captured by the CO2. This other sensor is used as a reference sensor. Each sensor of the CO2 sensor 2272 captures data associated with its associated wavelength, and the two sets of data are compared to determine how much CO2 is in the user's breath.

Measuring CO2 levels in exhaled breath may provide data about users' athletic performance and metabolic health. With that data, the user can be provided with guidance to help improve their athletic performance and metabolic health, including trainings that are more accurate for the user's abilities.

Figure 23:
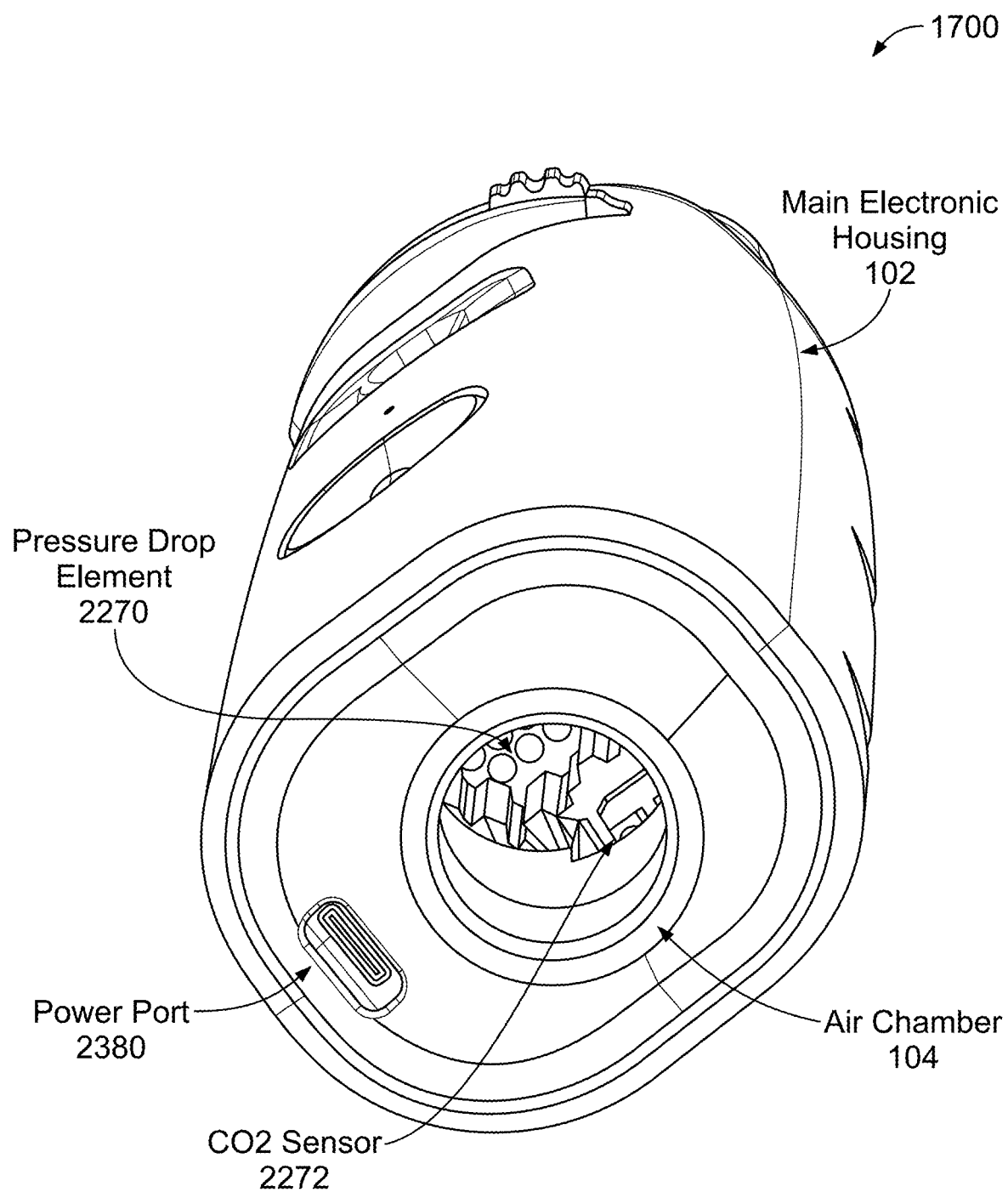
FIG. 23 illustrates a perspective view of handheld respiratory device 1700, according to embodiments of the present technology.

FIG. 23 illustrates a perspective view of handheld respiratory device 1700, according to embodiments of the present technology. As shown in FIG. 23, handheld respiratory device 1700 may include a power port 2380 to charge a battery used to power handheld respiratory device 1700. The battery may be rechargeable such that the battery may be recharged by connecting handheld respiratory device 1700 to an external power source at power port 2380.

Figure 24:
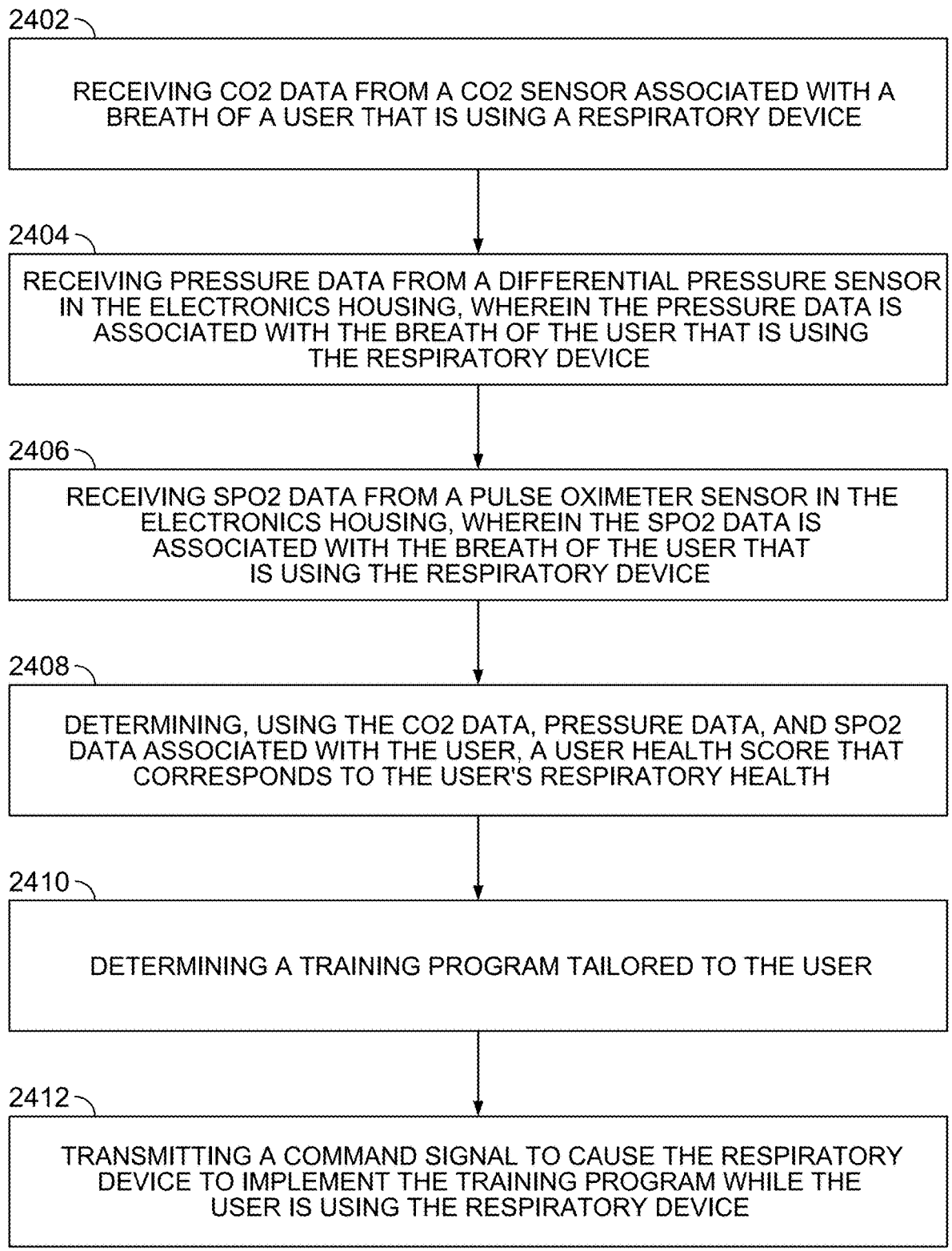
FIG. 24 illustrates a process according to embodiments of the present technology.

FIG. 24 illustrates a process according to embodiments of the present technology. Step 2402 includes receiving CO2 data from a CO2 sensor. The CO2 data may be associated with a breath of a user that is using the respiratory device. The CO2 sensor may be integrated within an air chamber of the respiratory device. Step 2404 includes receiving pressure data from a differential pressure sensor, wherein the pressure data is associated with the breath of the user that is using the respiratory device. The differential pressure sensor may be located in an electronics housing of the respiratory device. Step 2406 includes receiving SPO2 data from a pulse oximeter sensor, and wherein the SPO2 data is associated with the breath of the user that is using the respiratory device. The pulse oximeter sensor may be integrated within an air chamber of the respiratory device. Step 2408 includes determining a user health score that corresponds to the user's respiratory health. The health score may be determined using the CO2 data, pressure data, and SPO2 data. Step 2410 includes determining a training program tailored to the user. The training program may be configured to improve the user's respiratory health. The training program may be determined using the user health score. Step 2412 includes transmitting a command signal to cause the respiratory device to implement the training program while the user is using the respiratory device.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

That which is claimed is:

1. A respiratory training device, comprising:
a mouthpiece configured to fit within a user's lips and receive air from the user's breath; and
an electronics housing removably connected to the mouthpiece, the electronics housing comprising:
an air chamber configured to receive the air from the user's breath after the user breathes into the mouthpiece;
a differential pressure sensor configured to determine a first pressure of the received air;
one or more resistance valves configured to increase or decrease the first pressure of the received air to a second pressure;
a motor configured to control a position of the one or more resistance valves; and
a processor that receives data from the differential pressure sensor, wherein the processor performs steps comprising:
determining a current differential pressure being applied to the user's breath by comparing a pressure of the user's breath traveling through the air chamber and an ambient air pressure;
generating a respiratory training program for the user based on at least the differential pressure and a health score associated with the user, the health score computed using an algorithm personalized to the user, wherein the algorithm is personalized to the user such that a first health score for a first individual is computed using a first algorithm that weights heart rate differently from a second algorithm used to compute a second health score for a second individual;

outputting the respiratory training program for presentation to the user;
determining the user has not completed at least one step of the training program; and
generating an additional step of the training program for the user to perform based on the at least one step and an updated health score for the user.

2. The respiratory training device of claim 1, wherein the electronics housing further comprises one or more gears configured to change the position of the one or more resistance valves, and wherein the motor is configured to control the position of the one or more resistance valves by controlling the gears.

3. The respiratory training device of claim 1, wherein the electronics housing includes a pulse oximeter sensor configured to collect pulse oximetry data associated with the user when the user is holding onto the respiratory training device.

4. The respiratory training device of claim 1, wherein the electronics housing is configured to provide haptic feedback to the user while the respiratory training device implements the respiratory training program for the user.

5. The respiratory training device of claim 1, wherein the electronics housing further comprises a CO2 sensor to collect CO2 data associated with the user, and wherein the processor generates and outputs the respiratory training program for the user based on at least the differential pressure and the CO2 data.

6. The respiratory training device of claim 1, wherein the electronics housing further comprises an SpO2 sensor to collect SpO2 data associated with the user, and wherein the processor generates and outputs the respiratory training program for the user based on at least the differential pressure and the SpO2 data.

7. A respiratory device, comprising:
one or more data processors; and
a non-transitory computer-readable storage medium containing instructions, which when executed on the one or more data processors, cause the one or more data processors to perform operations including:
receiving pressure data associated with a breath of a user into the respiratory device;
determining, using the pressure data, a value of pressure being applied to the user's breath based on a current position of each of a set of resistance valves in the respiratory device;
comparing, by the one or more data processors, the pressure value with a previous pressure value associated with a previous breath of the user;
generating a respiratory training program for the user based on at least the comparison between the pressure value and the previous pressure value associated with the previous breath of the user and a health score associated with the user, the health score computed using an algorithm personalized to the user, wherein the algorithm is personalized to the user such that a first health score for a first individual is computed using a first algorithm that weights heart rate differently from a second algorithm used to compute a second health score for a second individual;
transmitting a command signal to adjust a speed of a motor within the respiratory device to correspond with the respiratory training program, wherein adjusting the speed of the motor causes a change in one or more resistance valves in the set of resistance valves in the respiratory device, wherein a position of each of the set of resistance valves determines an amount of pressure that is applied to the breath of the user during the user's next breath;
determining the user has not completed at least one step of the training program;
generating an additional step of the training program for the user to perform based on the at least one step and an updated health score for the user; and
transmitting an updated command signal to adjust the speed of the motor within the respiratory device based on the additional step of the training program.

8. The respiratory device of claim 7, wherein the instructions further comprise:
receiving, from a CO2 sensor in the respiratory device, CO2 data associated with the user, wherein the CO2 sensor includes a CO2 sensor emitter that transmits light to the CO2 sensor, wherein the light helps the CO2 sensor determine the CO2 data associated with the user.

9. The respiratory device of claim 7, wherein the command signal to adjust the speed of the motor is based on the comparison of the pressure value with the previous pressure value.

10. The respiratory device of claim 7, wherein the instructions further comprise:
receiving a communication from a mobile device associated with the user, wherein the communication indicates a desired change in the amount of pressure to be applied to the breath of the user during the user's next breath;
determining an amount to adjust the resistance valves based on the desired change in the amount of pressure to be applied to the user's next breath; and
implementing an adjustment of the resistance valves based on the determined amount to adjust the resistance valves.

11. The respiratory device of claim 7, wherein the instructions further comprise:
receiving, from a SPO2 sensor in the respiratory device, SPO2 data associated with the user; and
transmitting the SPO2 data to a graphical user interface to be viewed by the user.

12. The respiratory device of claim 7, wherein the one or more resistance valves include a valve assembly housing, a statie valve, and a dynamic valve, wherein the change in the one or more resistance valves includes an adjustment to the dynamic valve with respect to the statie valve, and no adjustment to the statie valve.

13. The respiratory device of claim 7, wherein the respiratory device further comprises an electronics housing that is configured to provide haptic feedback to the user while the respiratory device implements the respiratory training program for the user.

14. A computer-implemented method, the method comprising:
detecting, at a differential pressure sensor in a respiratory device, a breath of a user of the respiratory device;
collecting, at the differential pressure sensor, pressure data associated with the breath of the user;
determining, by a processor at the respiratory device and using the pressure data, a value of pressure being applied to the user's breath by the respiratory device;
comparing, by the processor, the pressure value with a previous pressure value associated with a previous breath of the user;
generating a respiratory training program for the user based on at least the comparison between the pressure value and the previous pressure value associated with the previous breath of the user and a health score associated with the user, the health score computed using an algorithm personalized to the user, wherein the algorithm is personalized to the user such that a first health score for a first individual is computed using a first algorithm that weights heart rate differently from a second algorithm used to compute a second health score for a second individual;

receiving, at a motor in the respiratory device and from the processor, a command signal to adjust a speed of the motor to correspond with the respiratory training program;

adjusting the speed of the motor, wherein adjusting the speed of the motor causes a change in one or more resistance valves integrated into the respiratory device, wherein a position of the resistance valves determines an amount of pressure that is applied to the breath of the user during the user's next breath;

determining the user has not completed at least one step of the training program;

generating an additional step of the training program for the user to perform based on the at least one step and an updated health score for the user; and transmitting an updated command signal to adjust the speed of the motor within the respiratory device based on the additional step of the training program.

15. The method of claim 14, further comprising:
collecting, at a CO2 sensor in the respiratory device, CO2 data associated with the user, wherein the CO2 sensor includes a CO2 sensor emitter that transmits light to the CO2 sensor, wherein the light helps the CO2 sensor determine the CO2 data associated with the user.

16. The method of claim 14, wherein the command signal to adjust the speed of the motor is based on the comparison of the pressure value with the previous pressure value.

17. The method of claim 14, further comprising:
receiving, at the processor, a communication from a mobile device associated with the user, wherein the communication indicates a desired change in the amount of pressure to be applied to the breath of the user during the user's next breath;

determining, by the processor, an amount to adjust the resistance valves based on the desired change in the amount of pressure to be applied to the user's next breath; and implementing, by the processor, an adjustment of the resistance valves based on the determined amount to adjust the resistance valves.

18. The method of claim 14, further comprising:
collecting, at a SPO2 sensor in the respiratory device, SPO2 data associated with the user; and
transmitting the SPO2 data to a graphical user interface to be viewed by the user.

19. The method of claim 14, wherein the algorithm is personalized for the user's goals and existing conditions.

20. The method of claim 14, wherein the health score is computed based on biometric data of the user captured by a smartwatch and biometric data of the user captured by the respiratory device.

* * * * *